United States Patent
Jung et al.

(10) Patent No.: US 12,193,094 B2
(45) Date of Patent: Jan. 7, 2025

(54) METHOD AND APPARATUS FOR FAILURE NOTIFICATION ON BACKHAUL LINK IN WIRELESS COMMUNICATION SYSTEM

(71) Applicant: LG Electronics Inc., Seoul (KR)

(72) Inventors: Sunghoon Jung, Seoul (KR); Gyeongcheol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 442 days.

(21) Appl. No.: 17/420,240

(22) PCT Filed: Feb. 14, 2020

(86) PCT No.: PCT/KR2020/002123
§ 371 (c)(1),
(2) Date: Jul. 1, 2021

(87) PCT Pub. No.: WO2020/167036
PCT Pub. Date: Aug. 20, 2020

(65) Prior Publication Data
US 2022/0070959 A1 Mar. 3, 2022

(30) Foreign Application Priority Data
Feb. 14, 2019 (KR) .................. 10-2019-0017488

(51) Int. Cl.
H04W 76/19 (2018.01)
H04W 24/10 (2009.01)
H04W 36/00 (2009.01)

(52) U.S. Cl.
CPC ........... *H04W 76/19* (2018.02); *H04W 24/10* (2013.01); *H04W 36/0055* (2013.01)

(58) Field of Classification Search
CPC ..... H04W 76/19; H04W 24/10; H04W 24/04; H04W 28/0289; H04W 36/0055; H04W 88/085; H04W 84/04
See application file for complete search history.

(56) References Cited

U.S. PATENT DOCUMENTS

| | | | |
|---|---|---|---|
| 2004/0061605 A1 | 4/2004 | Howard | |
| 2006/0013245 A1* | 1/2006 | Abedi ............. | H04W 72/54 370/433 |

(Continued)

FOREIGN PATENT DOCUMENTS

KR  100759312  9/2007

OTHER PUBLICATIONS

LG Electronics, "Discussions on node behavior for IAB link management," R1-1812567, Presented At 3GPP TSG RAN WG1 #95, Spokane, US Nov. 12-16, 2018, 5 pages.

(Continued)

*Primary Examiner* — Hardikkumar D Patel
(74) *Attorney, Agent, or Firm* — Fish & Richardson P.C.

(57) ABSTRACT

The present disclosure relates to method and apparatus for failure notification in wireless communications. According to an embodiment of the present disclosure, a method performed by a first wireless device in a wireless communication system comprises: detecting a failure of a backhaul link; performing a connection re-establishment attempt upon detecting the failure of the backhaul link; and transmitting a failure notification to a second wireless device based on a determination that the connection re-establishment attempt fails.

14 Claims, 24 Drawing Sheets

(56) References Cited

U.S. PATENT DOCUMENTS

2012/0314567 A1* 12/2012 Seo ...................... H04W 24/04
370/228
2016/0269952 A1* 9/2016 Moon ................... H04W 76/19
2020/0028545 A1* 1/2020 Koskela ............... H04B 7/0408
2020/0145860 A1* 5/2020 Koskela ............... H04W 76/14

OTHER PUBLICATIONS

Sharp, "Enhancements to Robustize IAB Networks to Radio Link Failure," R1-1813209, Presented At 3GPP TSG RAN WG1 Meeting #95, Spokane, USA, Nov. 12-16, 2018, 5 pages.
Huawei, HiSilicon, "On backhaul link radio link failure handling for Iab," R1-1901264, Presented at 3GPP TSG RAN WG1 Ad-Hoc Meeting 1901, Taipei, Jan. 21-25, 2019, 3 pages.

* cited by examiner

US 12,193,094 B2

METHOD AND APPARATUS FOR FAILURE NOTIFICATION ON BACKHAUL LINK IN WIRELESS COMMUNICATION SYSTEM

CROSS-REFERENCE TO RELATED APPLICATIONS

This application is a National Stage application under 35 U.S.C. § 371 of International Application No. PCT/KR2020/002123, filed on Feb. 14, 2020, which claims the benefit of Korean Patent Application No. 10-2019-0017488, filed on Feb. 14, 2019. The disclosures of the prior applications are incorporated by reference in their entirety.

BACKGROUND OF THE DISCLOSURE

Field of the Disclosure

The present disclosure relates to method and apparatus for failure notification in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communications, a RAN node may communicate with one or more other RAN nodes via backhauls. For example, fibers can be used for backhaul connection of RAN nodes. However, it is proposed that a part of a wireless spectrum is used for backhaul connection of base stations instead of fiber (i.e., wireless backhaul). This scheme may be referred to as "integrated access and backhaul (IAB)".

In IAB networks, since backhaul links between the RAN nodes may be wireless, some issues that may occur in access link may also occur in the wireless backhaul links. For example, a failure of backhaul links between the RAN nodes may occur like radio link failure (RLF) in access link.

SUMMARY OF THE DISCLOSURE

Technical Problem

An aspect of the present disclosure is to provide method and apparatus for failure notification on backhaul link in wireless communication system.

Another aspect of the present disclosure is to provide method and apparatus for early propagation of the failure notification in a wireless communication system.

Another aspect of the present disclosure is to provide method and apparatus for delayed-propagation of the failure notification in a wireless communication system.

Another aspect of the present disclosure is to provide method and apparatus for limiting the number of delayed-propagations of the failure notification in a wireless communication system.

Technical Solution

According to an embodiment of the present disclosure, a method performed by a first wireless device in a wireless communication system comprises: detecting a failure of a backhaul link; performing a connection re-establishment attempt upon detecting the failure of the backhaul link; and transmitting a failure notification to a second wireless device based on a determination that the connection re-establishment attempt fails.

According to an embodiment of the present disclosure, a first wireless device in a wireless communication system comprises: a transceiver; a memory; and at least one processor operatively coupled to the transceiver and the memory, and configured to: detect a failure of a backhaul link, perform a connection re-establishment attempt upon detecting the failure of the backhaul link, and control the transceiver to transmit a failure notification to a second wireless device based on a determination that the connection re-establishment attempt fails.

According to an embodiment of the present disclosure, a processor for a wireless device in a wireless communication system is configured to control the wireless device to perform operations comprising: detecting a failure of a backhaul link; performing a connection re-establishment attempt upon detecting the failure of the backhaul link; and transmitting a failure notification to a second wireless device based on a determination that the connection re-establishment attempt fails.

According to an embodiment of the present disclosure, a computer-readable medium having recorded thereon a program for performing each step of a method on a computer is provided. The method comprises: detecting a failure of a backhaul link; performing a connection re-establishment attempt upon detecting the failure of the backhaul link; and transmitting a failure notification to a second wireless device based on a determination that the connection re-establishment attempt fails.

Advantageous Effect

The present disclosure can have various advantageous effects.

For example, an IAB node in IAB network may determine whether to immediately propagate a failure notification for a backhaul link based on an early propagation condition and/or a failure-distance of the IAB node so that the network can achieve localization/minimization of a topological change via systematic and sequential recovery whenever possible, and can achieve a fostering of timely recovery when the localization/minimization of the topological change is hard to be achieved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
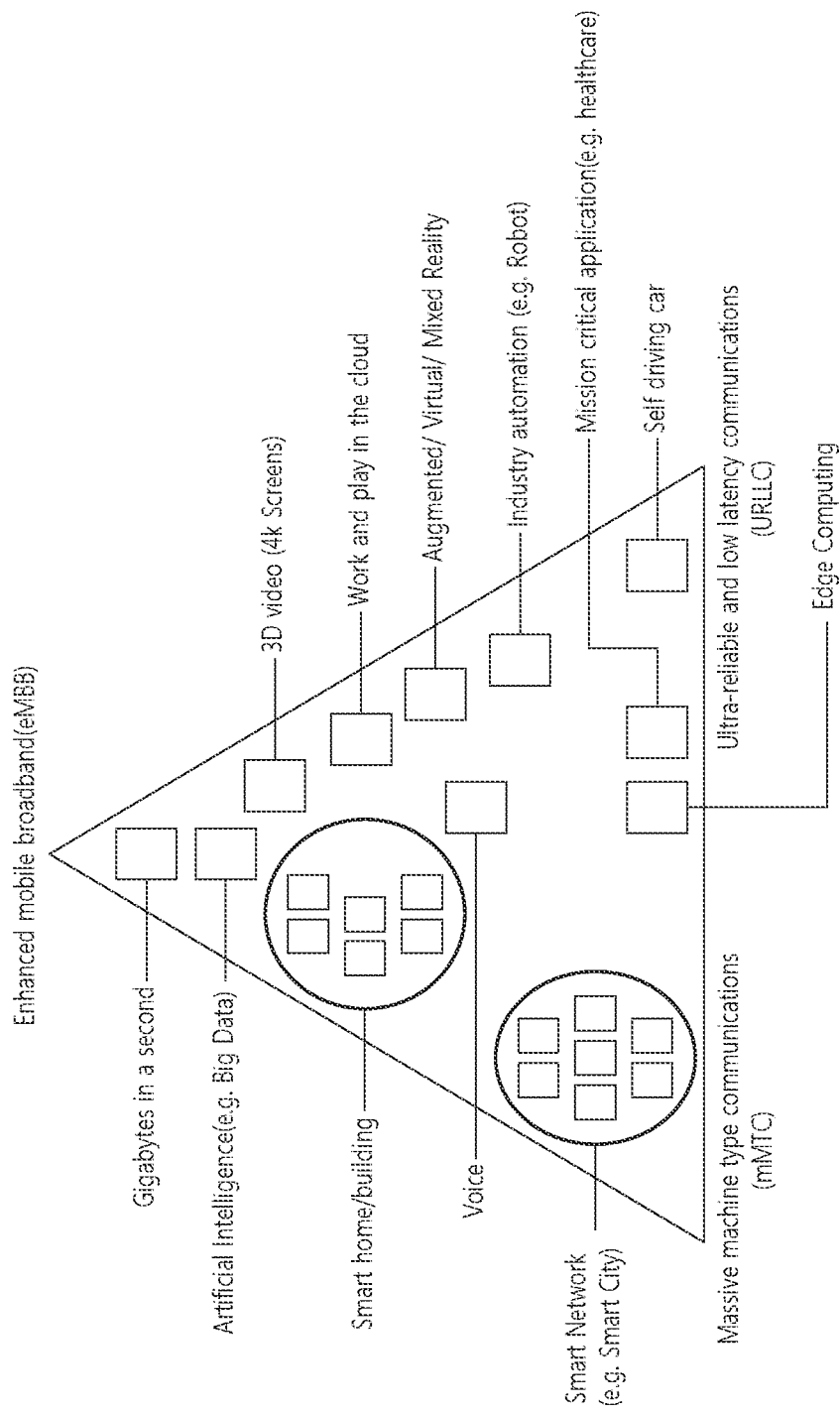
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

"Integrated access and backhaul (IAB)" refers to a scheme in which a part of a wireless spectrum is used for backhaul connection of base stations instead of fiber (i.e., wireless backhaul). The IAB node may be a kind of a wireless device.

"IAB node" refers to a RAN node that supports wireless access to user equipments (UE) s and wirelessly backhauls the access traffic. The IAB node and the UE may be a kind of a wireless device.

Throughout the disclosure, the terms 'radio access network (RAN) node', 'base station', 'eNB', 'gNB' and 'cell' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors, mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K. 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 KHz/60 kHz, dense-urban, lower latency and wider carrier bandwidth may be supported. When the SCS is 60 KHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHZ, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
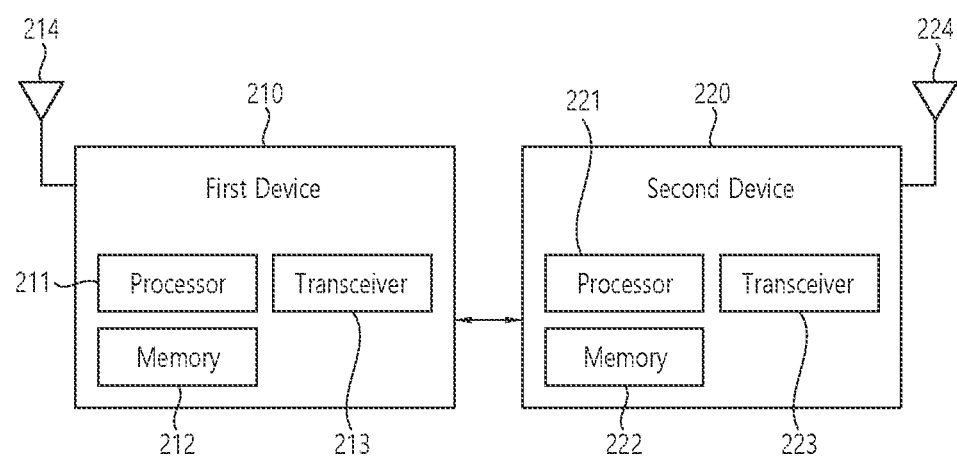
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g, a smartwatch, a smart glass, a head mounted display (HMD)). For example, the HMD may be a display device worn on the head. For example, the HMD may be used to implement AR. VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
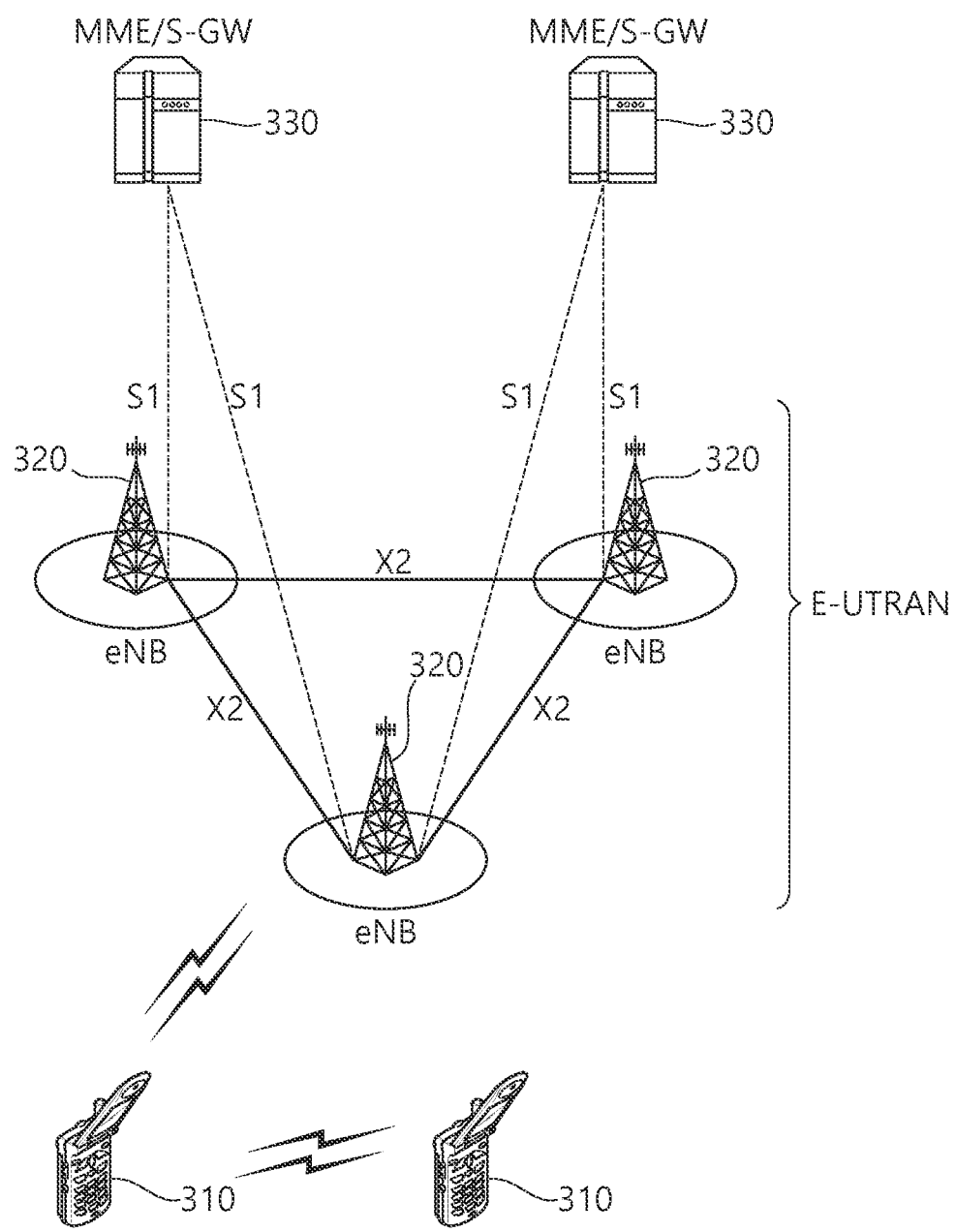
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway." but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
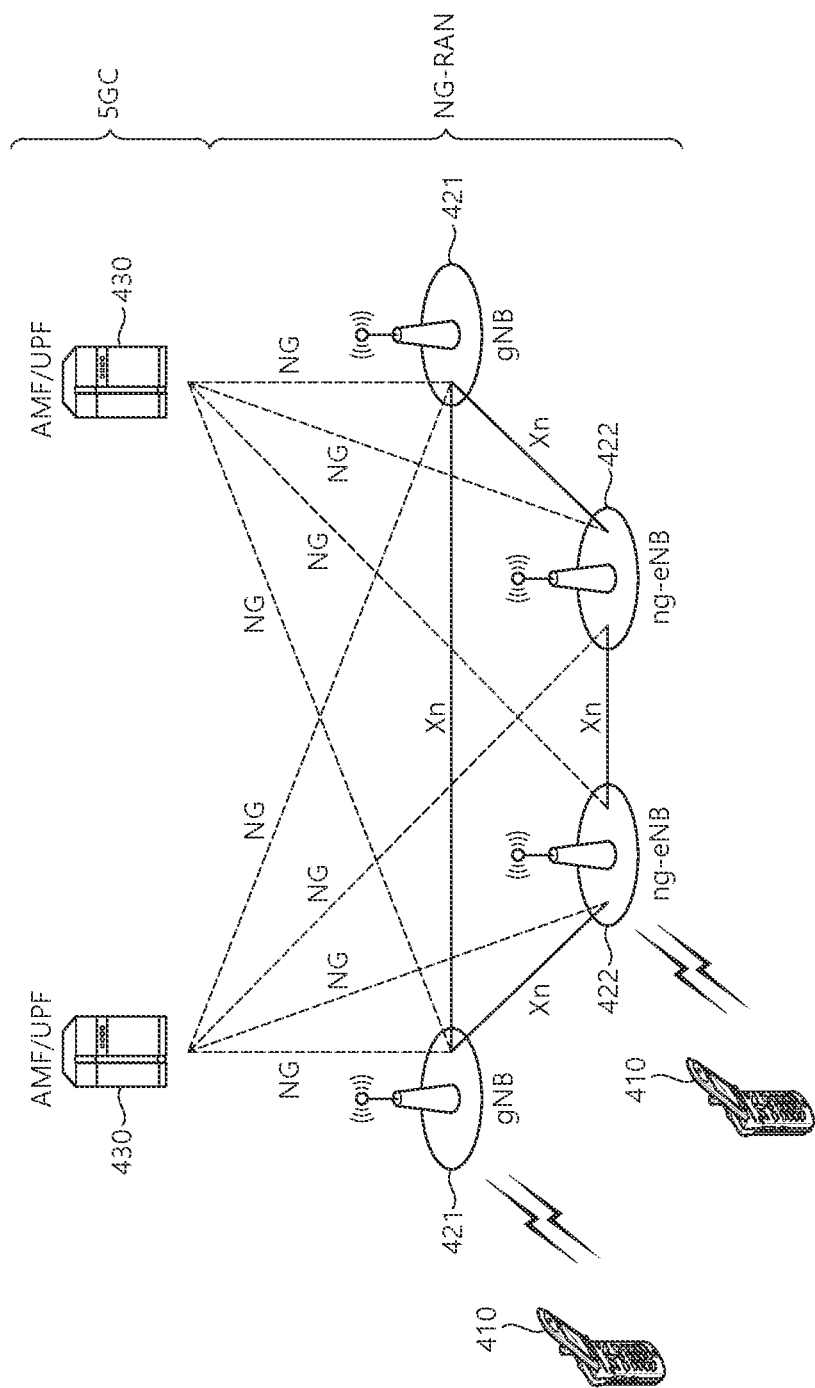
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g, eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
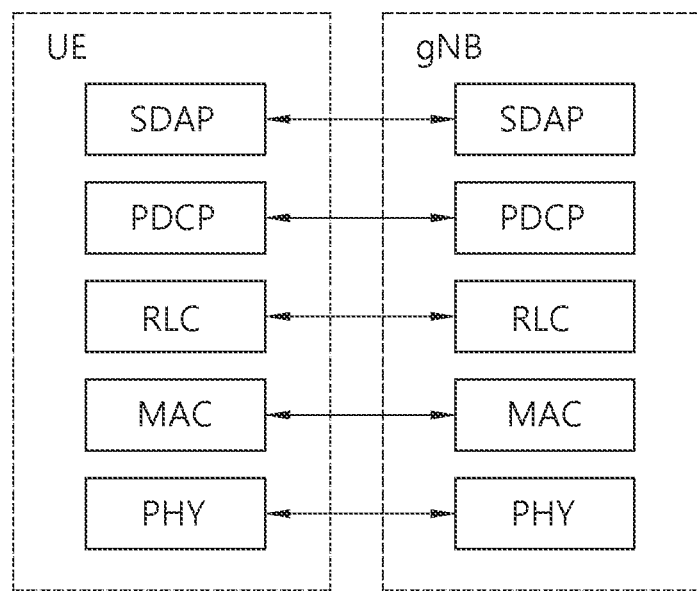
FIG. 5 shows a block diagram of a user plane protocol stack to which the technical features of the present disclosure can be applied.
Figure 6:
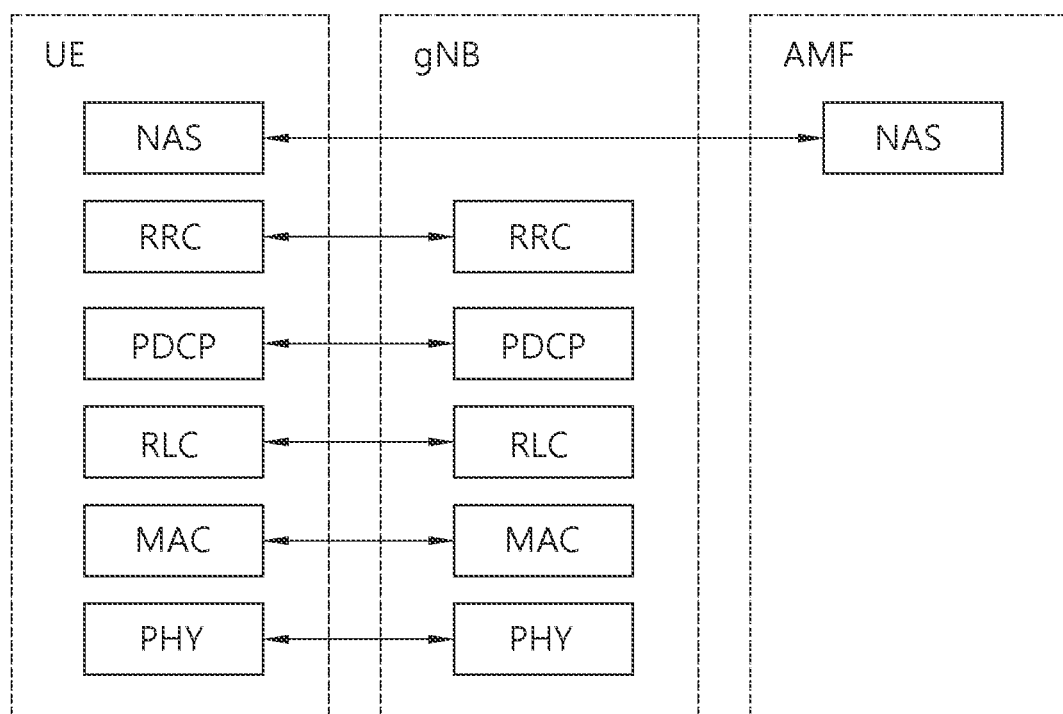
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes. i.e. transparent mode (TM), unacknowledged mode (UM), and acknowledged mode (AM), in order to guarantee various quality of services (QOS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection. PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions. QoS management functions. UE measurement reporting and control of the reporting. NAS message transfer to/from NAS from/to UE.

In other words, the RRC layer controls logical channels, transport channels, and physical channels in relation to the configuration·reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE. RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE. 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
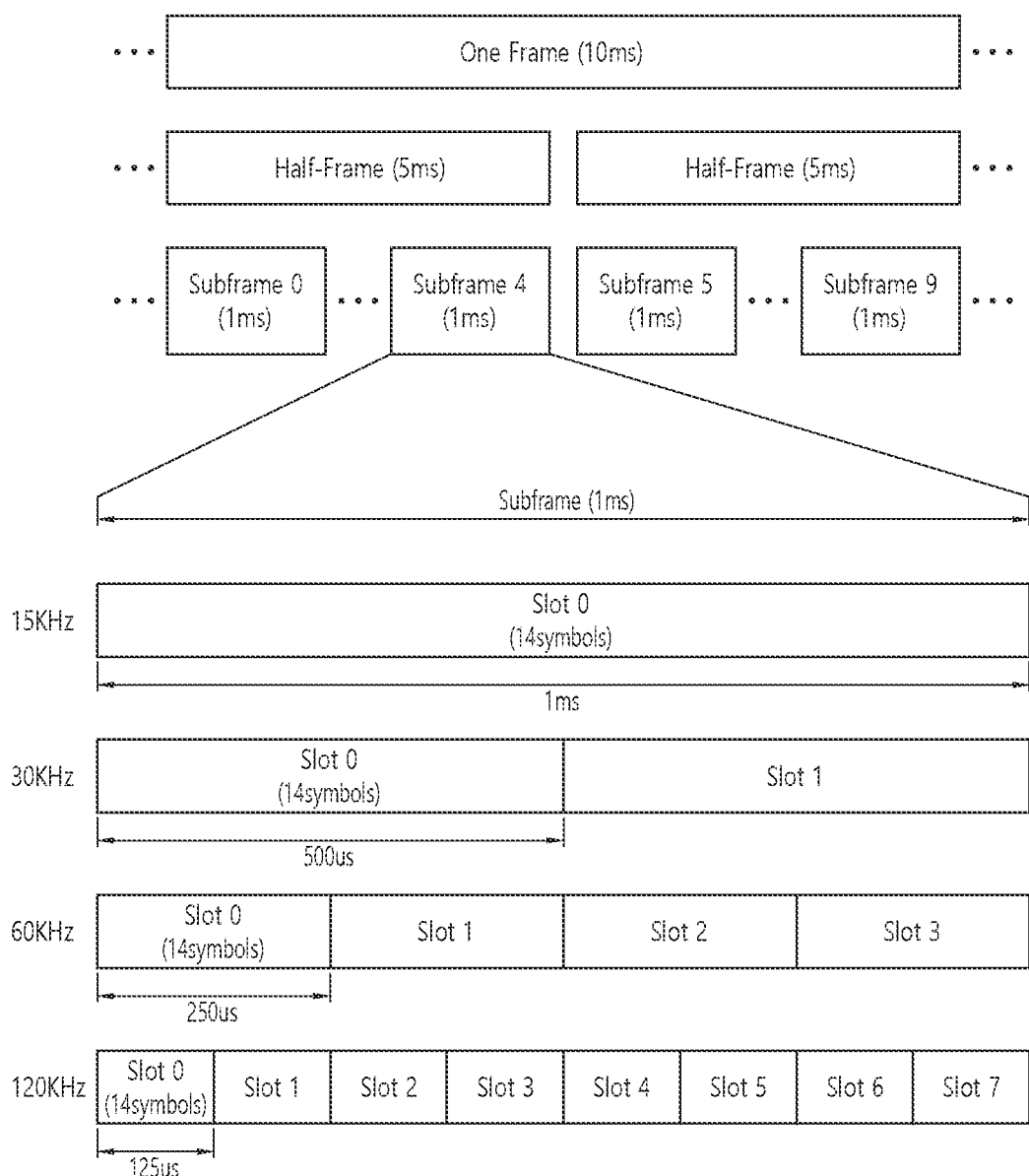
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g, a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2u*15$ KHz. The following table shows the number of OFDM symbols per slot, the number of slots per frame, and the number of slots per for the normal CP, according to the subcarrier spacing $\Delta f=2u*15$ kHz.

TABLE 3

| U | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2u*15$ KHz.

TABLE 4

| u | Nslotsymb | Nframe,uslot | Nsubframe,uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe, usymb OFDM symbols is defined, starting at common resource block (CRB) Nstart,ugrid indicated by higher-layer signaling (e.g. radio resource control (RRC) signaling), where Nsize, ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize, ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g . . . 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g., time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities. Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
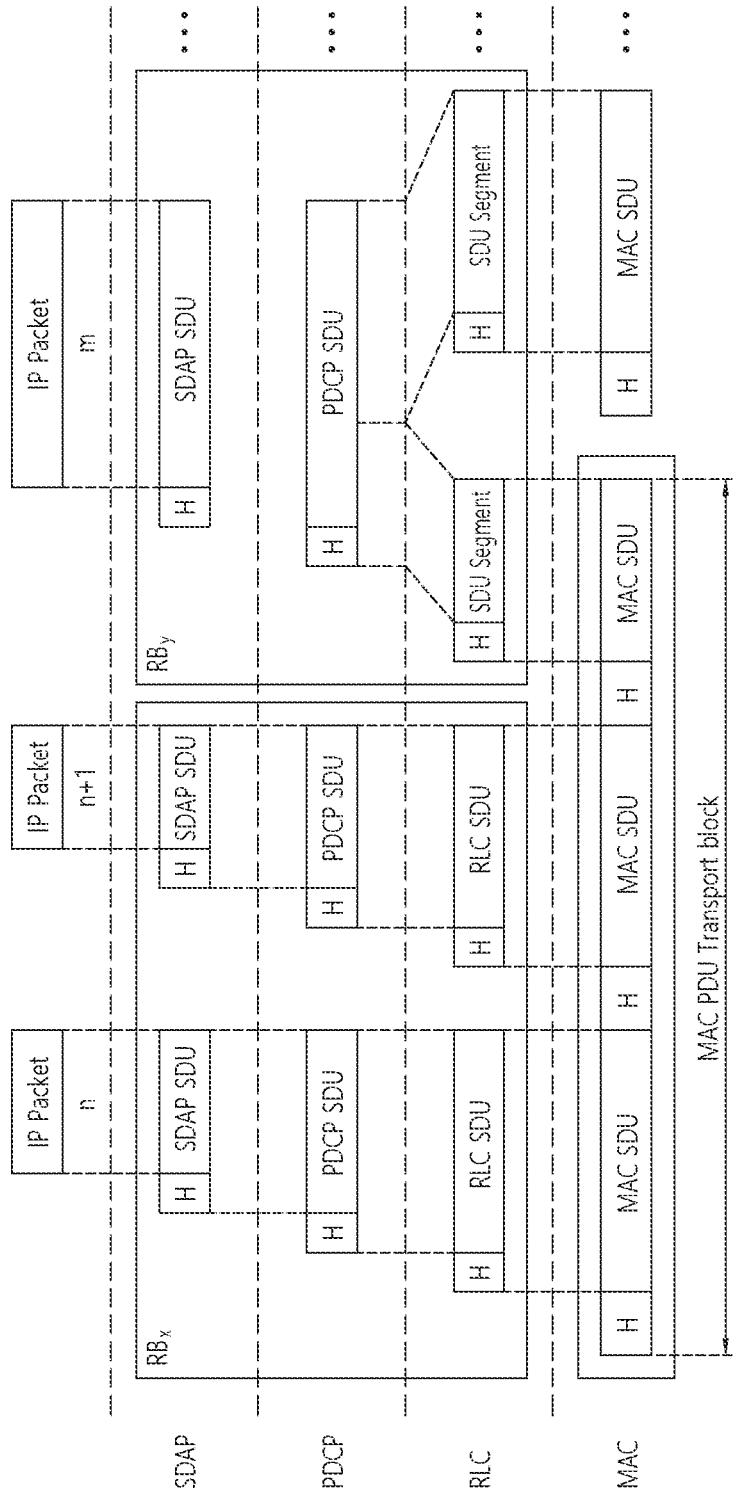
FIG. 8 illustrates a data flow example in the 3GPP NR system.

FIG. 8 illustrates a data flow example in the 3GPP NR system.

In FIG. 8. "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH. BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU. PDCP PDU. RLC SDU. RLC PDU. RLC SDU. MAC SDU. MAC CE. MAC PDU) in the present disclosure is (are) transmitted/received on a physical channel (e.g. PDSCH. PUSCH) based on resource allocation (e.g. UL grant. DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
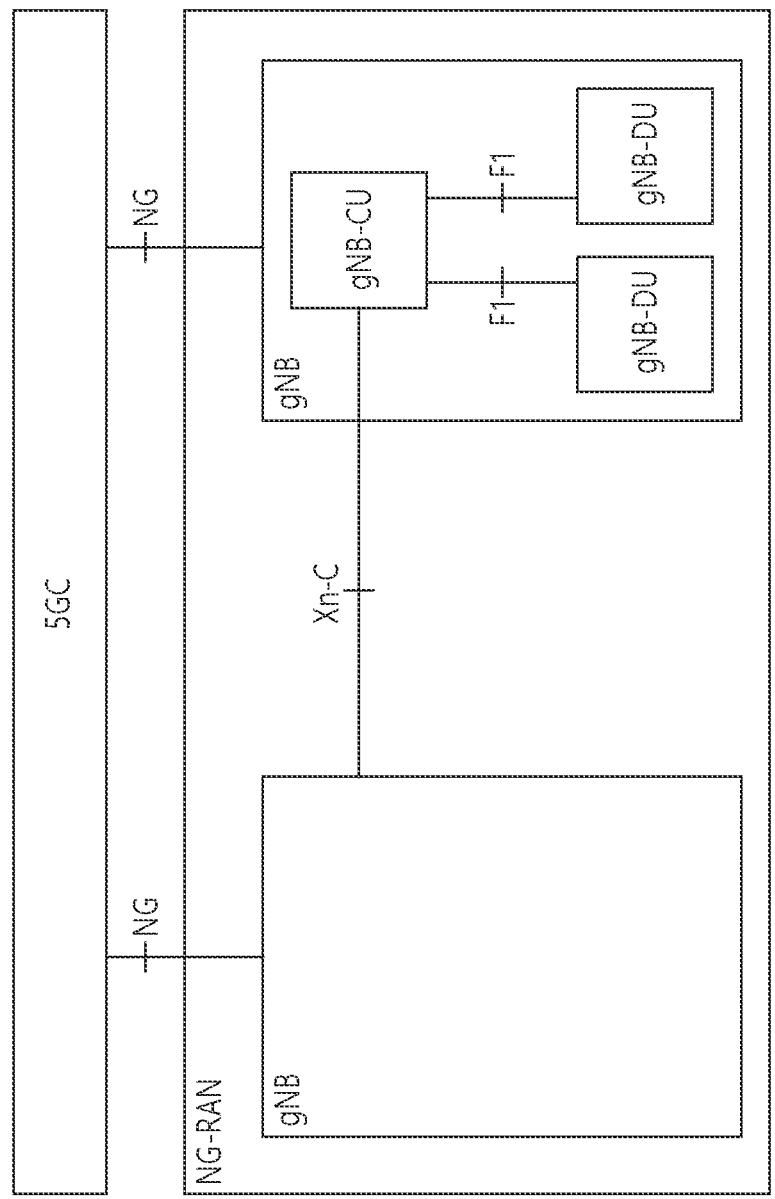
FIG. 9 shows an example of the overall architecture of an NG-RAN to which technical features of the present disclosure can be applied.

FIG. 9 shows an example of the overall architecture of an NG-RAN to which technical features of the present disclosure can be applied.

Referring to FIG. 9, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other S1 messages is needed, the gNB-DU is responsible for the encoding of SIB1 and the gNB-CU is responsible for the encoding of other S1 messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU.

The mapping between QoS flows and radio bearers is performed by gNB-CU and the granularity of bearer related management over F1 is radio bearer level. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

Figure 10:
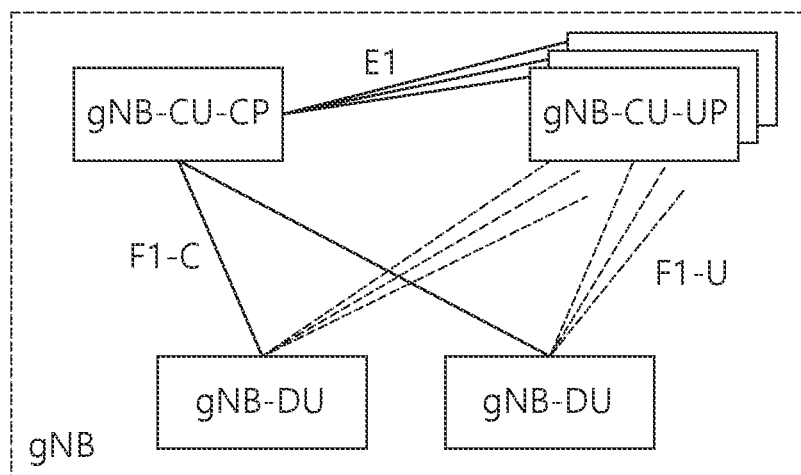
FIG. 10 shows an example of overall architecture for separation of gNB-CU-control plane (gNB-CU-CP) and gNB-CU-user plane (gNB-CU-UP) to which technical features of the present disclosure can be applied.

FIG. 10 shows an example of overall architecture for separation of gNB-CU-control plane (gNB-CU-CP) and gNB-CU-user plane (gNB-CU-UP) to which technical features of the present disclosure can be applied.

Referring to FIG. 10, a gNB may include a gNB-CU-CP, multiple gNB-CU-UPs and multiple gNB-DUs. A gNB-CU-CP may be simply referred to as CU-CP and a gNB-CU-UP may be simply referred to as CU-UP. The gNB-CU-CP and the gNB-CU-UP may be included in gNB-CU.

The gNB-CU-CP may be a logical node hosting an RRC and a control plane part of a PDCP protocol of the gNB-CU for a gNB. As illustrated, the gNB-CU-CP is connected to the gNB-DU through F1-C interface. The gNB-CU-CP terminates an E1 interface connected with the gNB-CU-UP and the F1-C interface connected with the gNB-DU.

The gNB-CU-UP may be a logical node hosting a user plane part of the PDCP protocol of the gNB-CU for a gNB, and the user plane part of the PDCP protocol and a SDAP protocol of the gNB-CU for a gNB. As illustrated, the gNB-CU-UP is connected to the gNB-DU through F1-U interface, and is connected to the gNB-CU-CP through the E1 interface. The gNB-CU-UP terminates the E1 interface connected with the gNB-Cu-CP and the F1-U interface connected with the gNB-DU.

According to an illustration shown in FIG. 10, the following properties may hold:

(1) A gNB-DU may be connected to a gNB-CU-CP.
(2) A gNB-CU-UP may be connected to a gNB-CU-CP.
(3) A gNB-DU can be connected to multiple gNB-CU-UPs under the control of the same gNB-CU-CP (i.e., the gNB-CU-CP to which the gNB-DU is connected and the multiple gNB-CU-UPs are connected).
(4) A gNB-CU-UP can be connected to multiple DUs under the control of the same gNB-CU-CP (i.e., the gNB-CU-CP to which the gNB-CU-UP is connected and the multiple DUs are connected).

Figure 11:
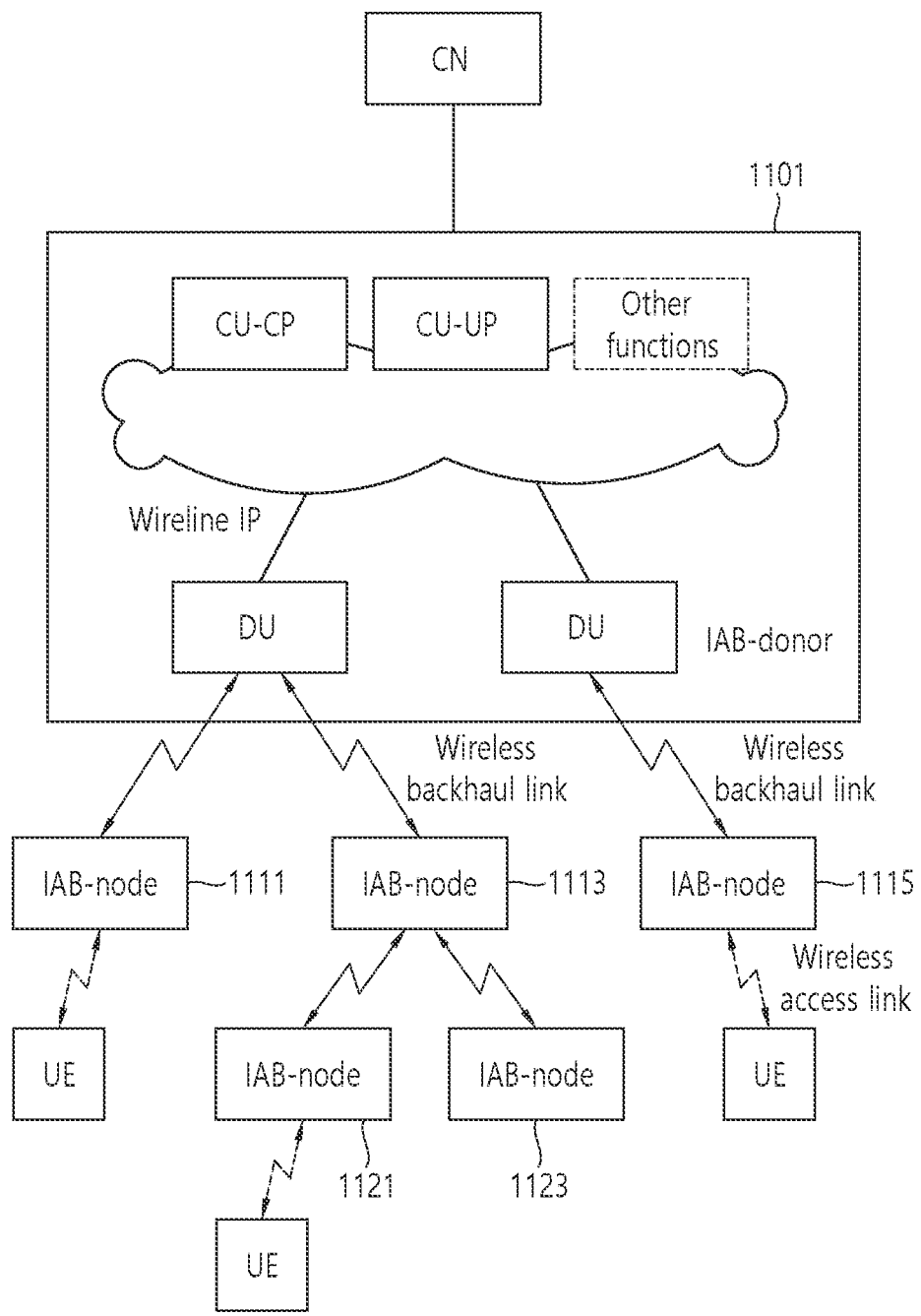
FIG. 11 shows an example of IAB topology to which technical features of the present disclosure can be applied.

FIG. 11 shows an example of IAB topology to which technical features of the present disclosure can be applied.

Referring to FIG. 11, the IAB topology may comprise an IAB donor 1101 and multiple IAB nodes 1111, 1113, 1115, 1121 and 1123. "IAB donor node (or, simply IAB donor)" refers to a RAN node which provides UE's interface to core network (CN) and wireless backhauling functionalities to IAB nodes. The IAB donor 1101 may be treated as a signal logical node that may comprise a set of functions such as DU, CU-CP, CU-UP and potentially other functions. In a deployment, the IAB donor can be split according to these functions, which can all be either collocated or non-collocated. Also, some of the functions presently associated with the IAB donor may eventually be moved outside of the IAB donor in case it becomes evident that the functions do not perform IAB-specific tasks.

The IAB donor 1101 may be connected to the IAB node 1111, 1113 and 1115 via wireless backhaul link, and may communicate with the IAB node 1111, 1113 and/or 1115 via the wireless backhaul link. For example, DUs of the IAB donor 1101 may be used to communicate with the IAB nodes 1111, 1113 and/or 1115 via wireless backhaul link. Each of the IAB node 1111 and 1115 may communicate with a UE served by itself via wireless access link. Further, the IAB donor 1101 may be a parent node for the IAB node 1111, 1113 and 1115, and the IAB node 1111, 1113 and 1115 may be a child node for the IAB donor 1101. The definition of the parent node and the child node will be described later.

The IAB node 1113 may be connected to IAB node 1121 and 1123 via wireless backhaul link, and may communicate with the IAB node 1121 and/or 1123 via wireless backhaul link. The IAB node 1121 may communicate with a UE served by itself via wireless access link. Further, the IAB node 1113 may be a parent node for the IAB node 1121 and 1123, and the IAB node 1121 and 1123 may be a child node for the IAB node 1113.

The IAB nodes 1111, 1113 and 1115 may directly communicate with IAB donor 1101 via wireless backhaul link. Therefore, the distance between the IAB donor 1101 and each of the IAB nodes 1111, 1113 and 1115 may be expressed as 1-hop distance. The IAB donor 1101 may be 1-hop parent node for the IAB nodes 1111, 1113 and 1115, and the IAB nodes 1111, 1113 and 1115 may be 1-hop child node for the IAB donor 1101.

The IAB nodes 1121 and 1123 may communicate with the IAB donor 1101 via a first wireless backhaul link and a second wireless backhaul link. The first wireless backhaul link may be a wireless backhaul link between i) the IAB node 1113 ii) the IAB nodes 1121 and/or 1123. The second wireless backhaul link may be a wireless backhaul link between the IAB node 1113 and the IAB donor 1101. Therefore, the distance between the IAB donor 1101 and each of the IAB nodes 1121 and 1123 may be expressed as 2-hop distance. The IAB donor 1101 may be 2-hop parent node for the IAB nodes 1121 and 1123, and the IAB nodes 1121 and 1123 may be 2-hop child node for the IAB donor 1101. In a similar way, N-hop distance may be defined between arbitrary IAB nodes (including or not including IAB donor), and thus, N-hop parent node and N-hop child node may also be defined.

Figure 12:
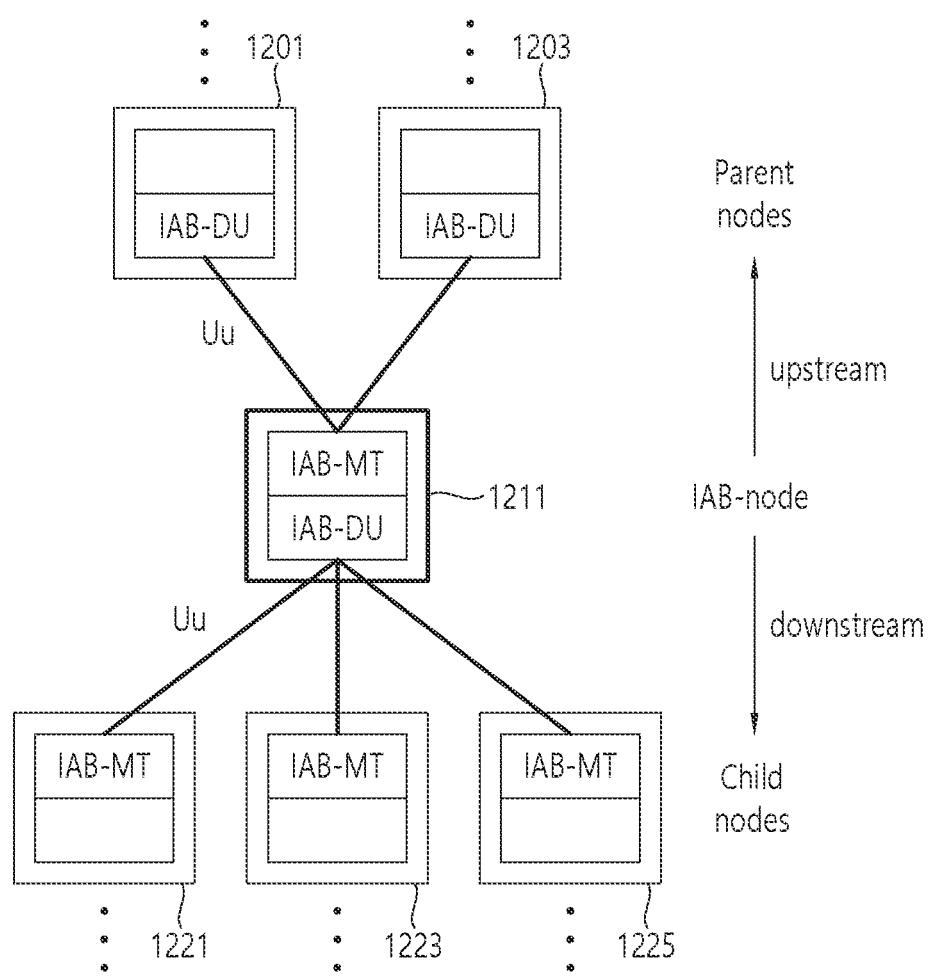
FIG. 12 shows a parent and child node relationship for IAB node to which technical features of the present disclosure can be applied.

FIG. 12 shows a parent and child node relationship for IAB node to which technical features of the present disclosure can be applied.

Referring to FIG. 12, an IAB node 1211 may be connected to parent nodes 1201 and 1203 via wireless backhaul links, and may be connected to child nodes 1221, 1223 and 1225 via wireless backhaul links. Throughout the disclosure, "parent IAB node (or, simply parent node)" for an IAB node may be defined as a next hop neighbor node with respect to an IAB-mobile termination (IAB-MT, or simply MT) of the IAB node. That is, the neighbor node on the IAB-MT's interface may be referred to as a parent node. The parent node can be IAB node or IAB donor-DU. Further, "child IAB node (or, simply child node)" for an IAB node may be defined as a next hop neighbor node with respect to an IAB-DU (or, simply DU) of the IAB node. That is, the neighbor node on the IAB-DU's interface may be referred to as a child node.

IAB-MT may refer to an IAB node function that terminates the Uu interface to the parent node. IAB-DU may refer to a gNB-DU functionality supported by the IAB node to terminate the access interface to UEs and next-hop IAB nodes, and/or to terminate the F1 protocol to the gNB-CU functionality on the IAB donor.

The direction toward the child node may be referred to as downstream while the direction toward the parent node may be referred to as upstream. Further, a backhaul link between an IAB node and a parent node for the IAB node may be referred to as upward backhaul link for the IAB node. A backhaul link between an IAB node and a child node for the IAB node may be referred to as downward backhaul link for the IAB node.

Figure 13:
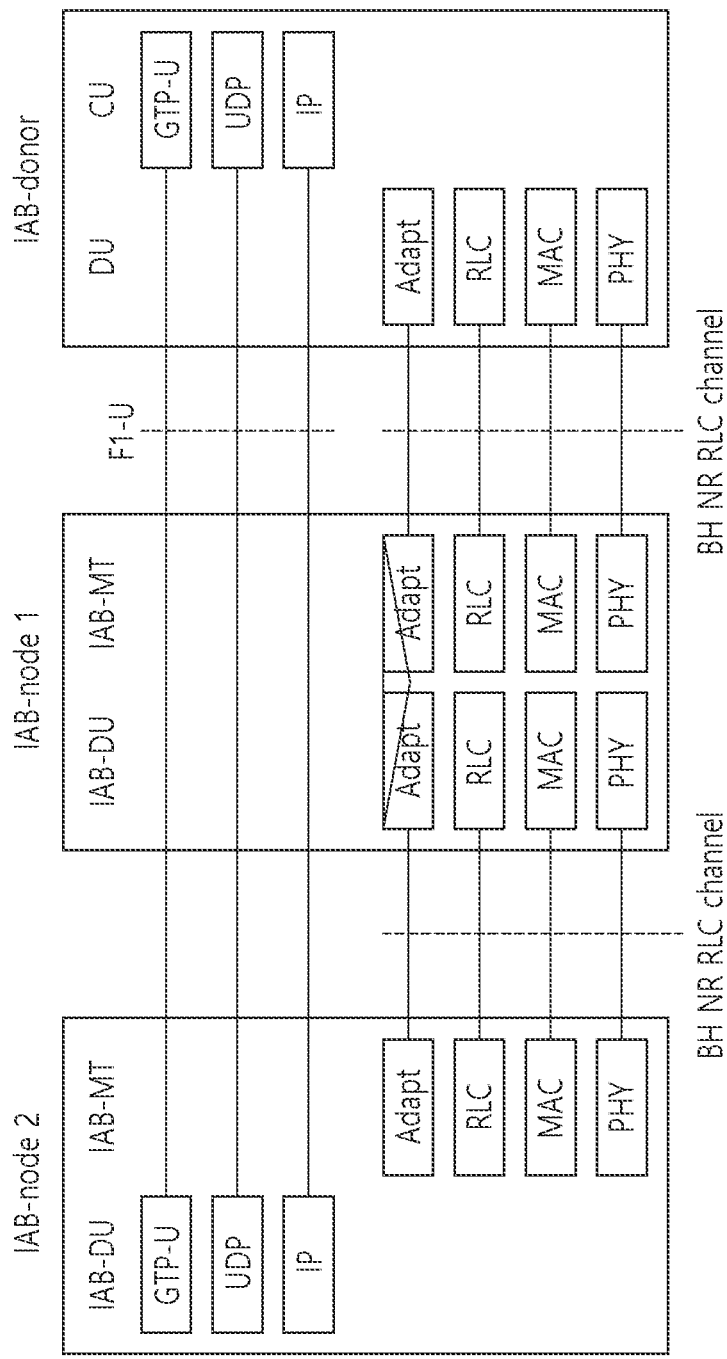
FIG. 13 shows an example of a protocol stack for F1-U protocol between IAB-DU and IAB donor-CU to which technical features of the present disclosure can be applied.
Figure 14:
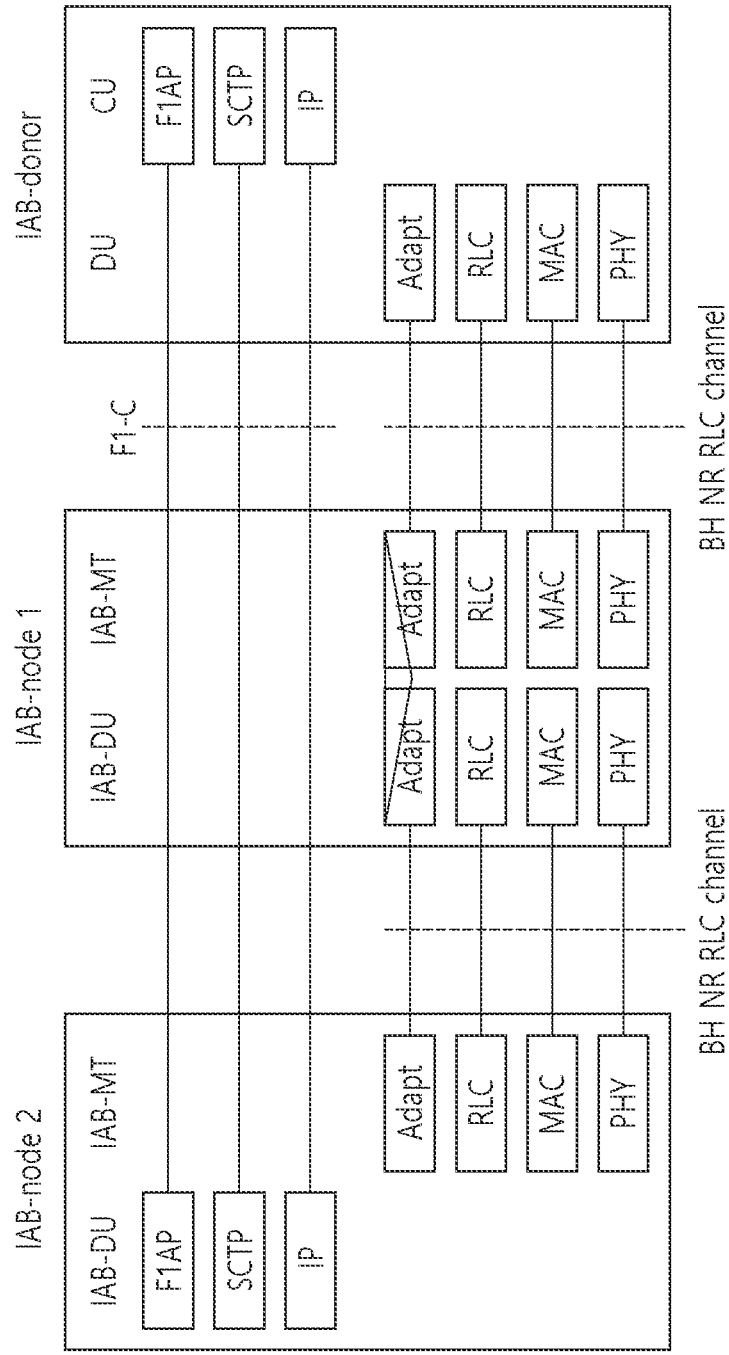
FIG. 14 shows an example of a protocol stack for F1-C protocol between IAB-DU and IAB donor-CU to which technical features of the present disclosure can be applied.

FIG. 13 shows an example of a protocol stack for F1-U protocol between IAB-DU and IAB donor-CU to which technical features of the present disclosure can be applied. FIG. 14 shows an example of a protocol stack for F1-C protocol between IAB-DU and IAB donor-CU to which technical features of the present disclosure can be applied. In FIGS. 13-14, it is exemplary assumed that F1-U and F1-C are carried over 2 backhaul hops.

Referring to FIGS. 13-14, each of the IAB donor, IAB node 1 and IAB node 2 may comprise an adaptation layer (or, adaptation layer/entity). On the wireless backhaul, the IP layer may be carried over the adaptation layer, which may enable routing over multiple hops. The IP layer may be also used for some non-F1 traffic, such as signalling traffic for the establishment and management of SCTP associations and the F1-supporting security layer.

On each backhaul link, the adapt PDUs may be carried by backhaul (BH) RLC channels. Multiple BH RLC channels can be configured on each BH link to allow traffic prioritization and QoS enforcement. The BH-RLC-channel mapping for adapt PDUs may be performed by the adapt entity on each IAB-node and the IAB-donor.

Throughout the disclosure, the adaptation layer may be also referred to as a backhaul adaptation protocol (BAP) layer.

Figure 15:
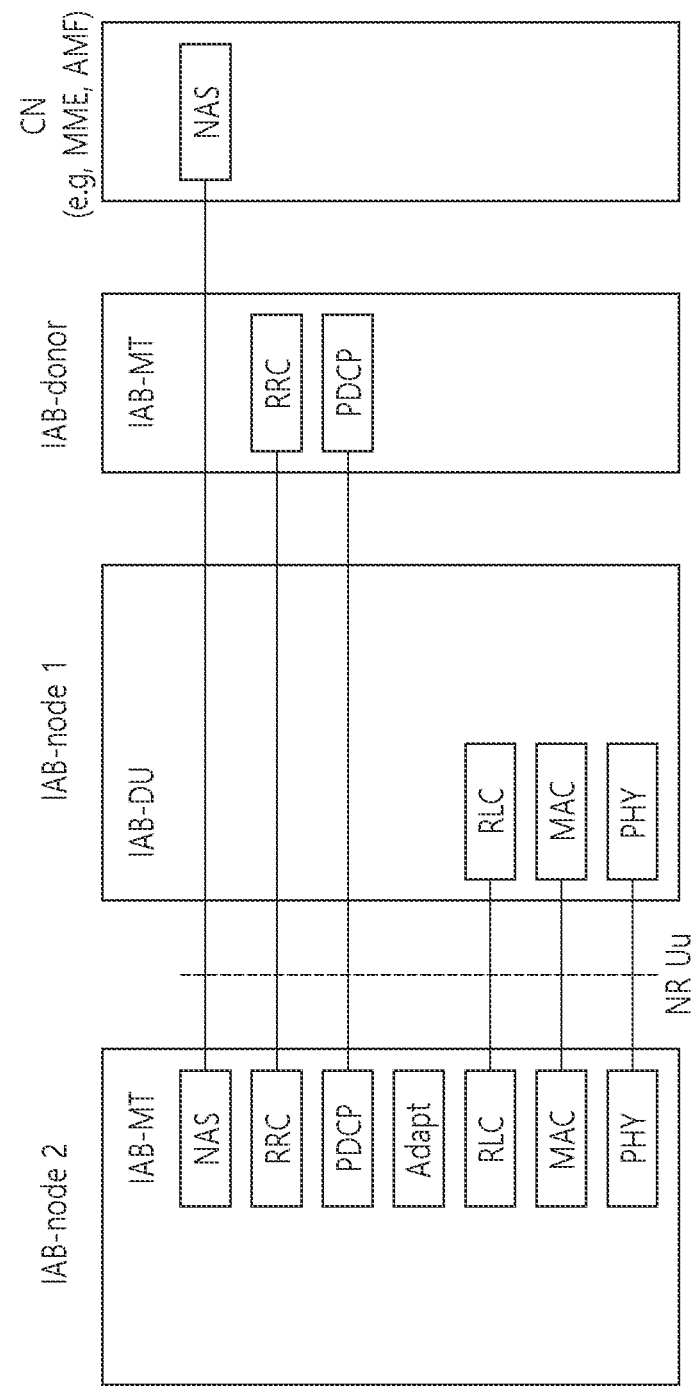
FIG. 15 shows an example of a protocol stack for IAB-MT's RRC and NAS connections.

FIG. 15 shows an example of a protocol stack for IAB-MT's RRC and NAS connections.

Referring to FIG. 15, protocol stacks for SRB and/or DRB are shown. The IAB-MT may establish SRBs carrying RRC and NAS and potentially DRBs (e.g, carrying OAM traffic) with the IAB-donor. These SRBs and DRBs may be transported between the IAB-MT of an IAB node and a parent node for the IAB node over Uu access channel(s).

As shown in FIG. 15, NAS/RRC/PDCP layer may be upper layers for adaptation layer, and RLC/MAC/PHY layer may be lower layers for the adaptation layer. In other words, the adaptation layer may lie between the RRC layer and the PDCP layer. Although not shown in FIG. 15, as well as the IAB-MT, the IAB-DU may also comprise the adaptation layer that lies between the RRC layer and the PDCP layer.

Hereinafter, details of the adaptation layer are described.

The UE may establish RLC channels to the DU on the UE's access IAB-node. Each of these RLC-channels may be extended via a potentially modified form of F1-U, referred to as F1*-U, between the UE's access DU and the IAB-donor.

The information embedded in F1*-U may be carried over RLC-channels across the backhaul links. Transport of F1*-U over the wireless backhaul may be enabled by an adaptation layer, which is integrated with the RLC channel.

Within the IAB-donor (may be referred to as fronthaul), the baseline may be to use native F1-U stack. The IAB-donor DU may relay between F1-U on the fronthaul and F1*-U on the wireless backhaul.

For example, information carried on the adaptation layer may support the following functions:
Identification of the UE-bearer for the PDU;
Routing across the wireless backhaul topology;
QoS-enforcement by the scheduler on DL and UL on the wireless backhaul link;
Mapping of UE user-plane PDUs to backhaul RLC channels; and/or
Potentially other functions.

For another example, information carried on the adaptation layer may support the following functions:
Routing across the wireless backhaul topology;
QoS-enforcement by the scheduler on DL and UL on the wireless backhaul link;
Mapping of UE user-plane PDUs to backhaul RLC channels; and/or
Potentially other functions.

In case the IAB-node is connected via multiple paths, different identifiers (e.g. route ID, IAB-node address) in the adaptation layer will be associated with the different paths, enabling adaptation layer routing on the different paths. The different paths can be associated with different backhaul RLC-channels.

For example, information to be carried on the adaptation layer header may include:
UE-bearer-specific Id;
UE-specific Id;
Route Id, IAB-node or IAB-donor address;
QoS information; and/or
Potentially other information.

IAB-nodes will use the identifiers carried via Adapt to ensure required QoS treatment and to decide which hop a packet should be sent to.

The UE-bearer-specific Id may be used by the IAB-node and the IAB-donor to identify the PDU's UE-bearer. UE's access IAB-node would then map Adapt information (e.g. UE-specific ID, UE-bearer specific ID) into the corresponding C-RNTI and LCID. The IAB-donor DU may also need to map Adapt information into the F1-U GTP-U TEID used between Donor DU and Donor CU.

UE-bearer-specific Id, UE-specific Id, Route Id, or IAB-node/IAB-donor address may be used (in combination or individually) to route the PDU across the wireless backhaul topology.

UE-bearer-specific Id, UE-specific Id, UE's access node IAB ID, or QoS information may be used (in combination or individually) on each hop to identify the PDU's QOS treatment. The PDU's QOS treatment may also be based on the LCID.

For example, the adaptation layer may be integrated with MAC layer or placed above MAC layer. For another example, the adaptation layer may be above RLC layer.

For 1:1 mapping of UE-bearers to backhaul RLC-channels, adaptation layer can be integrated with the MAC layer or placed above the MAC layer. A separate RLC-entity in each IAB-node is provided for each of these backhaul RLC-channels. Arriving PDUs are mapped to the corresponding RLC-entity based on the UE-bearer information carried by adaptation layer.

When UE-bearers are aggregated to backhaul RLC-channels (e.g, based on QoS-profile), adaptation layer can be placed above the RLC layer.

For both adaptation layer above RLC and adaptation layer above MAC, when UE bearers are aggregated to logical channels, the logical channel can be associated to a QoS profile. The number of QoS-profiles supported may be limited by the LCID-space.

While RLC channels serving for backhauling include the adaptation layer, the adaptation layer may or may not be included in IAB-node access links.

The adaptation layer may comprise sublayers. It may be perceivable, for example, that the GTP-U header becomes a part of the adaptation layer. It may also be possible that the GTP-U header is carried on top of the adaptation layer to carry end-to-end association between the IAB-node DU and the CU.

Alternatively, an IP header may be part of the adaptation layer or carried on top of the adaptation layer. In this example, the IAB-donor DU may hold an IP routing function to extend the IP-routing plane of the fronthaul to the IP-layer carried by adaptation layer on the wireless backhaul. This may allow native F1-U to be established end-to-end, (i.e. between IAB-node DUs and IAB-donor CU-UP). The scenario may imply that each IAB-node may hold an IP-address, which may be routable from the fronthaul via the IAB-donor DU. The IAB-nodes' IP addresses may further be used for routing on the wireless backhaul.

The IP-layer on top of the adaptation layer may not represent a PDU session. The MT's first hop router on this IP-layer therefore may not have to hold a user plane function (UPF).

Observations on adaptation layer placement (i.e., above-RLC adaptation layer or above-MAC adaptation layer) may be as the followings:

1. The above-RLC adaptation layer can only support hop-by-hop ARQ. The above-MAC adaptation layer can support both hop-by-hop and end-to-end ARQ.

2. Both adaptation layer placements can support aggregated routing (e.g, by inserting an IAB-node address into the adaptation header).

3. UE-specific ID may be a completely new identifier or one of the existing identifiers can be reused. The identifier(s) included in adaptation layer may vary depending on the adaptation layer placement.

4. Both adaptation layer placements can support per-UE-bearer QoS treatment. In order for each UE bearer to receive individual QoS support when their number exceeds the size of the LCID space, one possible solution may be the extension of the LCID-space which can be achieved through changes to the MAC sub-header, or by dedicated information placed in the adaptation header. Enhancements to BSR reporting may be required.

5. Both adaptation layer placements can support aggregated QoS handling as in the following example network configurations:
   a. For above-RLC adaptation layer, UE-bearers with same QoS profile could be aggregated to one backhaul RLC-channel for this purpose;
   b. For above-MAC or integrated-with-MAC adaptation layer, UE-bearers with same QoS profile could be treated with same priority by the scheduler.

6. For both adaptation layer placements, aggregation of routing and QoS handling may allow proactive configuration of intermediate on-path IAB-nodes (i.e. configuration may be independent of UE-bearer establishment/release).

7. For both adaptation layer placements, RLC ARQ can be pre-processed on TX side.

Figure 16:
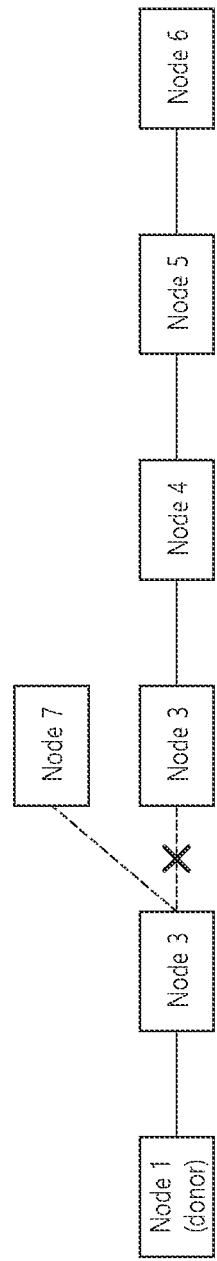
FIG. 16 shows an example of a backhaul link failure to which technical features of the present disclosure can be applied.

FIG. 16 shows an example of a backhaul link failure to which technical features of the present disclosure can be applied.

Referring to FIG. 16, a backhaul link between an IAB node 2 and IAB node 3 may fail. For a backhaul link failure, N-hop failure distance descendent/child node may be defined. For example, N-hop failure distance descendent/child node may be defined as a node that is a descendent/child node with N-hop distance from a failure-detecting node that detects a failure of its backhaul link established between the failure-detecting node and its parent node. Throughout the disclosure, N-hop failure-distance descendent/child node may be simply referred to as N-hop child node for notational simplicity.

In a case illustrated in FIG. 16, the IAB node 3 may be 0-hop failure distance child node, and the IAB node 4 may be 1-hop failure distance child node. In other words, the IAB node 4 may be away from the backhaul link failure by 1-hop failure distance.

In IAB networks, an IAB node may declare a failure of an upward backhaul link for the IAB node. There are various reasons for the backhaul failure—for example, radio quality degradation due to temporal appearance of blockage along the backhaul link or failure to comply a configuration received from the IAB donor. An IAB node may declare a backhaul failure (radio link failure) of a its backhaul link if a timer that may start upon detecting a physical layer problem on the backhaul link and stop upon recovery of a physical layer problem on the backhaul link expires. An IAB node may declare a failure (radio link failure) if random access problem on the backhaul link is indicated. An IAB node may declare a failure (radio link failure) if the maximum number of retransmission has been reached on the backhaul link. Upon detecting the backhaul link failure, the IAB node(s) in the IAB network may need to recover the backhaul link by topology adaptation or a routing adaptation. To trigger such adaption for recovery, the failure-detecting node may notify the backhaul failure event to child node(s) for the failure-detecting node such that the child node(s) can trigger a proper action for such adaptation. In multi-hop IAB networks, fully autonomous adaptation by all affected descendant nodes (i.e., 1 to N hop child nodes for the failure-detecting node) and UEs upon a backhaul failure can lead to an inefficient rearrangement of the network topology. If such adaptation is triggered almost concurrently by all affected descendent nodes, the resulting topology may be never expected and consequence could be chaotic. Given this problem, the recovery process upon backhaul link failure may need to be sufficiently localized in a topological sense, whenever possible. On the other hand, such a local adaption for recovery may be too slow or even fail, and in this case, the adaptation responsibility needs to be timely forwarded to the lower topological nodes (e.g, child nodes) to avoid unnecessarily long service interruption for those affected descendent nodes.

Therefore, various embodiments of the present disclosure propose a method of a controlled propagation of a failure notification and a method of a recovery to execute a systematic recovery procedure after detecting a backhaul link failure in IAB networks. According to various embodiments of the present disclosure, parent node change events may be attempted sequentially to topologically downward direction initially from the zero-hop failure distance node, and a node attempting the parent node change may decide whether the node needs to trigger an early propagation of the received failure notification.

Figure 17:
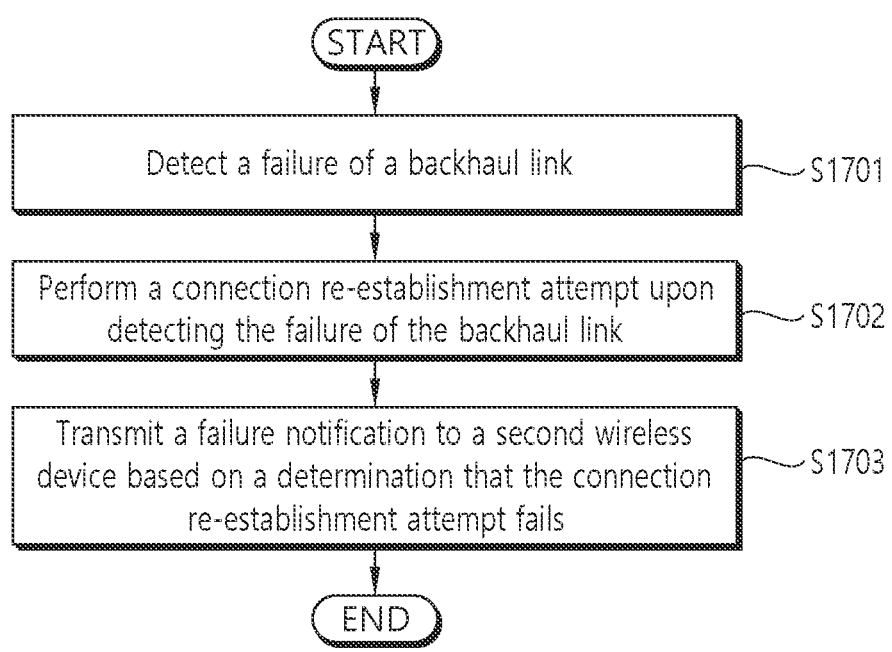
FIG. 17 shows an example of a method for transmitting a failure notification for a backhaul link according to an embodiment of the present disclosure.

FIG. 17 shows an example of a method for transmitting a failure notification for a backhaul link according to an embodiment of the present disclosure. Steps illustrated in FIG. 17 may be performed by a first wireless device such as an IAB node.

Referring to FIG. 17, in step S1701, the first wireless device (e.g., IAB node) may detect a failure of a backhaul link. That is, the first wireless device may declare a failure of a backhaul link. For example, the backhaul link may be an upward or a downlink backhaul link for the first wireless device. For another example, the backhaul link may be an upward or a downlink backhaul link for a parent node for the first wireless device.

In step S1703, the first wireless device may perform a connection re-establishment attempt upon detecting the failure of the backhaul link. The first wireless device may perform a recovery attempt upon detecting the failure of the backhaul link.

In step S1705, the first wireless device may transmit a failure notification to a second wireless device based on a determination that the connection re-establishment attempt fails. For example, the first wireless device may transmit a failure notification to a second wireless device upon detecting that the connection re-establishment attempt fails.

According to various embodiments, the first wireless device may receive, from a parent node for the first wireless device, the failure notification on the failure of the backhaul link and detect the failure of the backhaul link. The second wireless device may be a child node for the first wireless device.

According to various embodiments, the first wireless device may identify a hop-count value in the received failure notification. The first wireless device may determine whether the hop-count value is greater than a delay threshold. For example, hop-count value identified by the first wireless device may represent the number of transmissions of the failure notification so that the failure notification is transmitted from a failure detecting node and is received by the first wireless device. The failure detecting node may be an IAB node which detects a failure of a backhaul link related to the IAB node without receiving a failure notification from other IAB node(s). For another example, the hop-count value may represent a failure distance of the first wireless device. The failure distance of the first wireless device may be a hop-distance (e.g., 1-hop. 2-hop) between the first wireless device and a failure-detecting node. The first wireless device may perform the connection re-establishment attempt based on a determination that the hop-count value is less than or equal to the delay threshold. If the hop-count value is greater than the delay threshold, the first wireless device may transmit the failure notification to the second wireless device upon determining that the hop-count value is greater than the delay threshold, without performing the connection re-establishment attempt.

According to various embodiments, the delay threshold may be configured for the first wireless device by a donor node via a higher layer signalling (e.g., RRC signalling and/or F1AP signalling), or informed by the failure notification received from the parent node. The failure notification may comprise a configuration of the delay threshold.

According to various embodiments, the first wireless device may increment the hop-count value by 1. The first wireless device may transmit the failure notification comprising the incremented hop-count value to the second wireless device.

According to various embodiments, after (or, upon) receiving the failure notification the first wireless device may start a timer. The first wireless device may start the timer upon determining that an early propagation condition is not configured, or the early propagation condition is configured but not satisfied. The first wireless device may perform the connection re-establishment attempt while the timer is running. The first wireless device may transmit the failure notification to the second wireless device based on a determination that the timer expires or the connection re-establishment attempt fails while the timer is running.

According to various embodiments, a value of the timer is configured for the first wireless device by a donor node via a higher layer signalling (e.g., RRC signalling or F1AP signalling), or informed by the failure notification received from the parent node. The failure notification may comprise the timer value.

According to various embodiments, the first wireless device may not immediately transmit the failure notification and perform the connection re-establishment attempt based on a determination that: an early propagation condition is not configured for the first wireless device; or the early propagation condition is configured for the first wireless device and is not satisfied. When the early propagation condition is configured for the first wireless device, the first wireless device may determine whether the early propagation condition is satisfied upon detecting the failure of the backhaul link. The early propagation condition may be a condition for transmitting a failure notification on the failure of the backhaul link to a child node upon determining that the early propagation condition is satisfied.

According to various embodiments, the early propagation condition may comprise at least one of: a first condition that a list of candidate nodes for the connection re-establishment attempt is not configured for the first wireless device: or a second condition that mobility commands of the candidate nodes are not configured for the first wireless device.

According to various embodiments, the early propagation condition may be provided by the donor node to the first wireless device, or informed by the failure notification. If the early propagation condition is configured for the first wireless device, the first wireless device may transmit a failure notification on the failure of the backhaul link to a child node upon determining that the early propagation condition is satisfied.

According to various embodiments, the first wireless device may select a parent node for the first wireless device that is different from a current parent node for the first wireless device. The first wireless device may perform an attempt to establish a connection between the first wireless device and the selected parent node.

According to various embodiments, the first wireless device may perform a conditional handover from a current parent node for the first wireless device to another parent node.

According to various embodiments, the first wireless device may receive, from a parent node for the first wireless device, handover conditions of candidate parent nodes and handover conditions for the candidate parent node. The first wireless device may identify a parent node among the candidate parent nodes which satisfies a handover condition for the parent node based on a result of a measurement on the parent node. The first wireless device may apply a handover command of the identified parent node to perform the conditional handover from the current parent node to the identified parent node.

According to various embodiments, the failure notification may comprise at least one of an identifier/identity (ID) of an IAB node associated with a failed backhaul link (i.e., a backhaul link in which a failure occurs), or an ID of the failed backhaul link among, for example, one or more backhaul links between the IAB node and one or more parent nodes for the IAB node.

More specifically, if an IAB node detects a failure of a backhaul link established between the IAB node and its parent node, the IAB node may transmit a failure notification for the backhaul link to its 1-hop failure-distance child IAB node(s). Upon receiving the failure notification from its parent node, the 1-hop child node may consider that its own upward backhaul fails. Then the 1-hop child node may evaluate whether there is a need of an early propagation of the failure notification to downward direction (i.e. to its child IAB(s) nodes), depending on the specified condition. According to the evaluation, if the early propagation condition is not satisfied, the 1-hop child node may defer a forwarding of the received failure notification to its child node(s). Upon failure declaration on its own upward backhaul link, the 1-hop child node may attempt to change its parent node by establishing a new communication path towards its donor IAB node via other parent node as a recovery process. During the deferred propagation, the 1-hop child node may stop performing uplink and downlink transmission with its original parent node (i.e., current parent node). If the recovery attempt is successful under a restriction (e.g. limited time period allowed for recovery), the partial topology originated from the recovered node can remain unaffected. If the early propagation condition is satisfied according to the evaluation, or if the recovery attempt is not successful for the time period allowed for recovery, then the 1-hop child node may immediately forward the failure notification to its child node(s) (i.e., 2-hop failure distance child node(s)).

Even if an IAB node has received a failure notification from its parent node, the IAB node may be allowed to perform uplink (UL) transmission to its parent node until the criterion for declaring the failure of its own upward backhaul link is satisfied (i.e., until a recovery process such as attempting to change its parent node by establishing a new communication path towards its donor IAB node via other parent node is not successful for the time period allowed for recovery). This is because the IAB node has not declared the failure of its own upward backhaul link.

Figure 18:
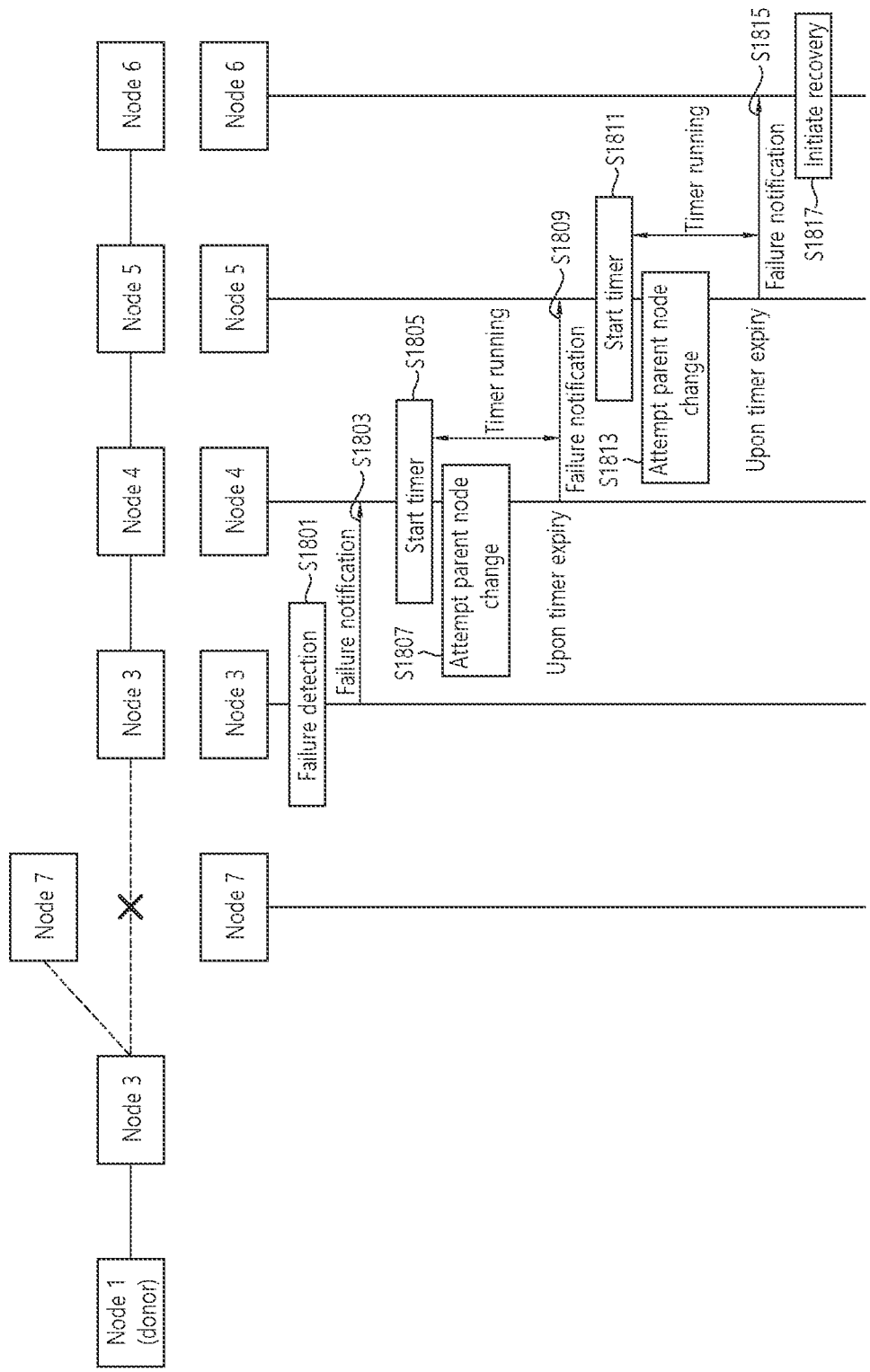
FIG. 18 shows an example of a propagation of a failure notification for a backhaul link when a recovery attempt fails according to an embodiment of the present disclosure.

FIG. 18 shows an example of a propagation of a failure notification for a backhaul link when a recovery attempt fails according to an embodiment of the present disclosure.

Referring to FIG. 18, in step S1801, an IAB node 3 (i.e., zero-hop failure-distance IAB node) may monitor a backhaul link established between the IAB node 3 and its parent IAB node (i.e., IAB node 2) to detect the occurrence of the failure of the backhaul link, and may identify the occurrence of the backhaul link failure.

In step S1803, if the IAB node 3 identifies the occurrence of the backhaul link failure, the IAB node 3 may construct a message that notifies the failure of the backhaul link and deliver a failure notification message (or simply failure notification) for the backhaul link to its 1-hop failure-distance child IAB node(s) (e.g., IAB node 4). The failure notification message may represent 1-hop distance backhaul link failure.

In step S1805, upon receiving the failure notification, the IAB node 4 receiving the failure notification may start a timer. If the IAB node 4 (i.e., 1-hop failure-distance node) is not configured with a condition to evaluate the need of an early failure notification propagation (i.e., early propagation condition), or if the IAB node 4 (i.e., 1-hop failure-distance node) is configured with the condition to evaluate the need of an early failure notification propagation and the condition is not satisfied, the IAB node 4 may not immediately propagate/transmit the failure notification to its child node(s) (i.e., IAB node 5).

According to various embodiments, the timer value that an IAB node applies may be configured by a donor node via RRC signalling or F1AP signaling. The timer value may be configured by a parent node for the IAB node, and in this case, the timer value may be indicated by failure notification message sent by the parent node.

According to various embodiments, the early propagation condition may comprise at least one of:
A first condition that a list of prepared nodes or cells corresponding to the prepared nodes allowed as a target node for a quick connection/parent node change event is not configured to the concerned node (e.g., IAB node 4): or
A second condition that a conditional mobility/handover command is not configured to the concerned node (e.g., IAB node 4).

For example, the early propagation condition may be (pre-) configured/provisioned to IAB node(s) by the donor node or a parent node for the IAB node(s). For another example, the failure notification itself may include a configuration related to the early propagation condition. In such case, the IAB node 4's parent node (i.e., IAB node 3) can include the configuration in the failure notification.

In step S1807, the IAB node 4 may perform a recovery attempt to establish a new communication path/link preferably with other IAB node, or to perform a change of its parent node as a recovery process, while the timer is running. For example, the IAB node 4 may perform a connection re-establishment attempt. The IAB node 4 may consider its parent node (i.e., IAB node 3) as access-barred, and search for other candidate nodes to re-connect. If the IAB node 4 is already configured with some UE-autonomous mobility criteria (often called conditional mobility/handover), the IAB node 4 may evaluate the criteria and perform a mobility based on the criteria e.g., by selecting an IAB node satisfying the mobility criterion and attempting to connect to the selected IAB node.

In step S1809, if the timer expires or the recovery attempt does not succeed while the timer is running, the IAB node 4 may immediately send a failure notification to its child node(s) (i.e. two or more hop failure-distance child nodes, for example IAB node 5 and IAB node 6).

According to various embodiments, the IAB node 4 may also immediately send a failure notification to its child node(s) (i.e. two or more hop failure-distance child nodes, for example IAB node 5 and IAB node 6) if the condition to trigger the early failure notification propagation (i.e., early propagation condition) is configured for the IAB node 4 and is satisfied. In this case, the IAB node 4 may not start the timer in step S1805.

The IAB node 5 may perform steps S1811, S1813 and S1815 which are similar to S1805, S1807 and S1809, respectively.

In step S1817, if the last-hop failure-distance node (i.e., IAB node 6) receives the failure notification, the last-hop failure-distance node may immediately initiate a connection re-establishment or other type of MT-initiated mobility. The IAB node 6 may consider its parent node (i.e., IAB node 5) as access-barred, and search for other candidate nodes to re-connect. If the IAB node 6 is already configured with some UE-autonomous mobility criteria (often called conditional mobility/handover), the IAB node 6 may evaluate the criteria and perform a mobility based on the criteria e.g, by selecting an IAB node satisfying the mobility criterion and attempting to connect to the selected IAB node.

Figure 19:
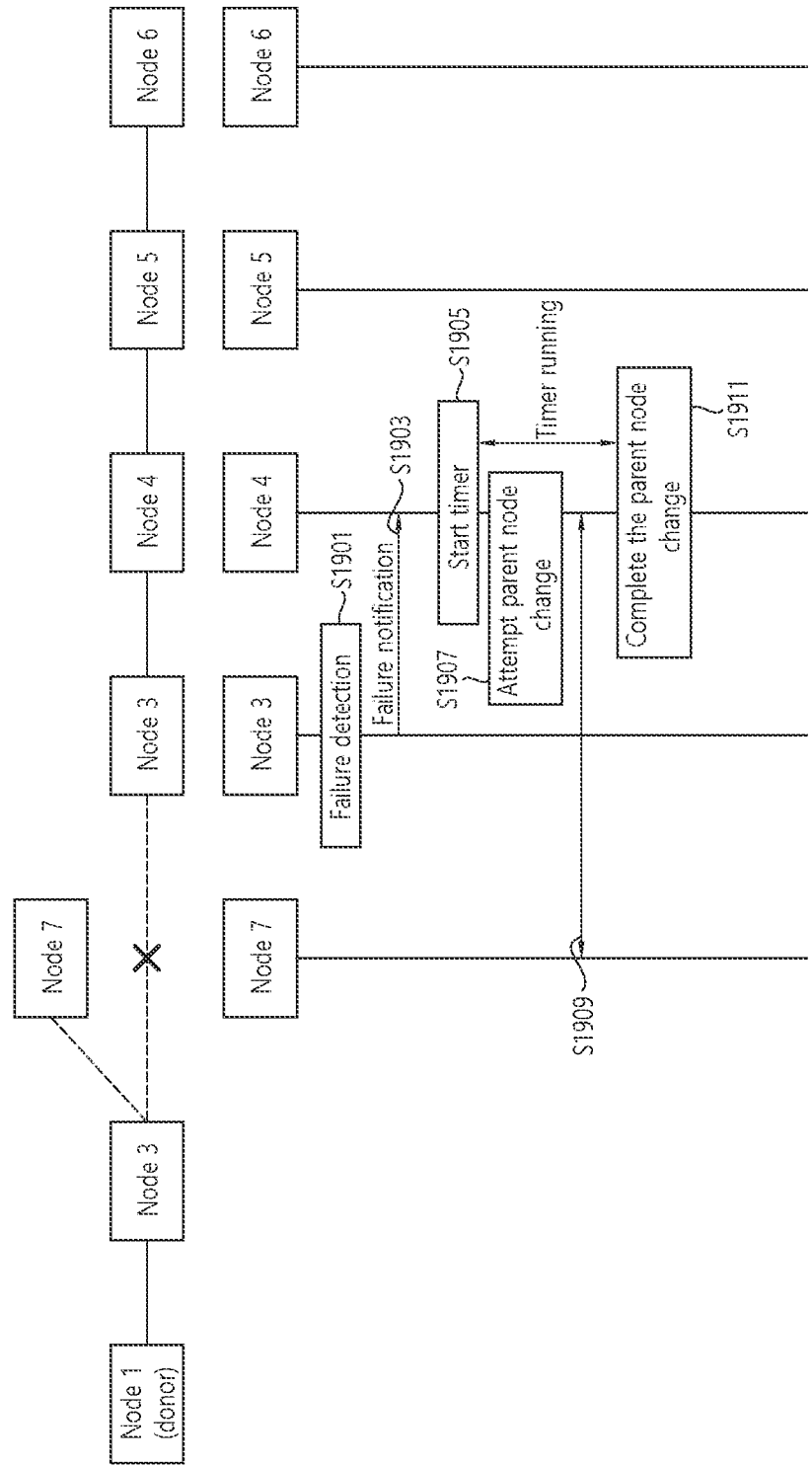
FIG. 19 shows an example of a propagation of a failure notification for a backhaul link when a recovery attempt succeeds according to an embodiment of the present disclosure.

FIG. 19 shows an example of a propagation of a failure notification for a backhaul link when a recovery attempt succeeds according to an embodiment of the present disclosure.

Referring to FIG. 19, in step S1901, an IAB node 3 (i.e., zero-hop failure-distance IAB node) may monitor a backhaul link established between the IAB node 3 and its parent IAB node (i.e., IAB node 2) to detect the occurrence of the failure of the backhaul link, and may identify the occurrence of the backhaul link failure.

In step S1903, if the IAB node 3 identifies the occurrence of the backhaul link failure, the IAB node 3 may construct a message that notifies the failure of the backhaul link and deliver a failure notification message (or simply failure notification) for the backhaul link to its 1-hop failure-distance child IAB node(s) (e.g., IAB node 4). The failure notification message may represent 1-hop distance backhaul link failure.

In step S1905, upon receiving the failure notification, the IAB node 4 receiving the failure notification may start a timer. If the IAB node 4 (i.e., 1-hop failure-distance node) is not configured with a condition to evaluate the need of an early failure notification propagation (i.e., early propagation condition), or if the IAB node 4 (i.e., 1-hop failure-distance node) is configured with the condition to evaluate the need of an early failure notification propagation and the condition is not satisfied, the IAB node 4 may not immediately propagate/transmit the failure notification to its child node(s) (i.e., IAB node 5).

In step S1907, the IAB node 4 may perform a recovery attempt to establish a new communication path/link preferably with other IAB node, or to perform a change of its parent node as a recovery process, while the timer is running. For example, the IAB node 4 may perform a connection re-establishment attempt. The IAB node 4 may consider its parent node (i.e., IAB node 3) as access-barred, and search for other candidate nodes to re-connect. If the IAB node 4 is already configured with some UE-autonomous mobility criteria (often called conditional mobility/handover), the IAB node 4 may evaluate the criteria and perform a mobility based on the criteria e.g., by selecting an IAB node satisfying the mobility criterion and attempting to connect to the selected IAB node.

In step S1909, if a recovery process comprising a recovery attempt to other IAB node (i.e., IAB node 7) and/or a parent node change to the IAB node 7 succeeds while the timer is running, a connection between the IAB node 4 and the IAB node 7 may be established. The IAB node 4 may reset the timer if the recovery process is successful while the timer is running.

In step S1911, the IAB node 4 may complete the parent node change to the IAB node 7 after establishing the connection between the IAB node 4 and the IAB node 7.

In some cases, in order to limit the maximum latency allowed for the systematic sequential recovery processes, recovery event may be attempted only for the IAB nodes having the failure-hop distance that is equal to or less than a threshold (i.e., delay threshold). If the failure notification propagates to an IAB node having the failure-hop distance that is greater than the threshold, the IAB node receiving the failure notification may immediately forward the failure notification to its child node.

More specifically, the threshold may be set to a value without loss of generality. If an IAB node detects a failure of a backhaul link established between the IAB node and its parent IAB node, the IAB node may transmit a failure notification on the failure of the backhaul link to its 1-hop failure-distance child IAB node(s). Upon receiving the failure notification, the 1-hop failure-distance child IAB node may determine whether or not to immediately forward the failure notification to its child IAB node(s) (i.e. two or more hop failure-distance child node(s)), depending on the specified condition (e.g . . . depending on whether the 1-hop failure-distance child IAB node has configured candidate IAB node(s) prepared for quick connection recovery). If the 1-hop failure-distance node identifies that the specified condition is satisfied, the 1-hop failure-distance child IAB node may defer the forwarding of the received failure notification to its child node(s). During the deferred period, the 1-hop failure-distance child node may attempt to establish a new communication path/link preferably with other IAB node as a recovery process. If the recover attempt is successful, the topology of two or more hop failure-distance child nodes can remain unaffected by the backhaul link failure. On the other hand, if the 1-hop failure distance child node identifies that the specified condition is not satisfied, the 1-hop failure-distance child IAB node may immediately forward the failure notification to its child node(s). (i.e. two or more hop failure-distance child nodes). Then, upon receiving the forwarded failure notification, the child node can immediately initiate its own recovery process without consuming unnecessary delay (e.g. initiating connection re-establishment or other type of MT-initiated mobility).

According to various embodiments, the failure notification message may include a hop-count field that represents the failure hop distance between the zero-hop failure-distance child node and the IAB node receiving the failure notification message. That is, the hop-count field identified by an IAB node may represent the number of transmissions of the failure notification so that the failure notification is transmitted from a failure-detecting node and is received by the IAB node. The hop-count field may be incremented by one whenever the failure notification message is propagated by one hop to its downward direction (i.e. when delivered/relayed to child nodes).

Figure 20:
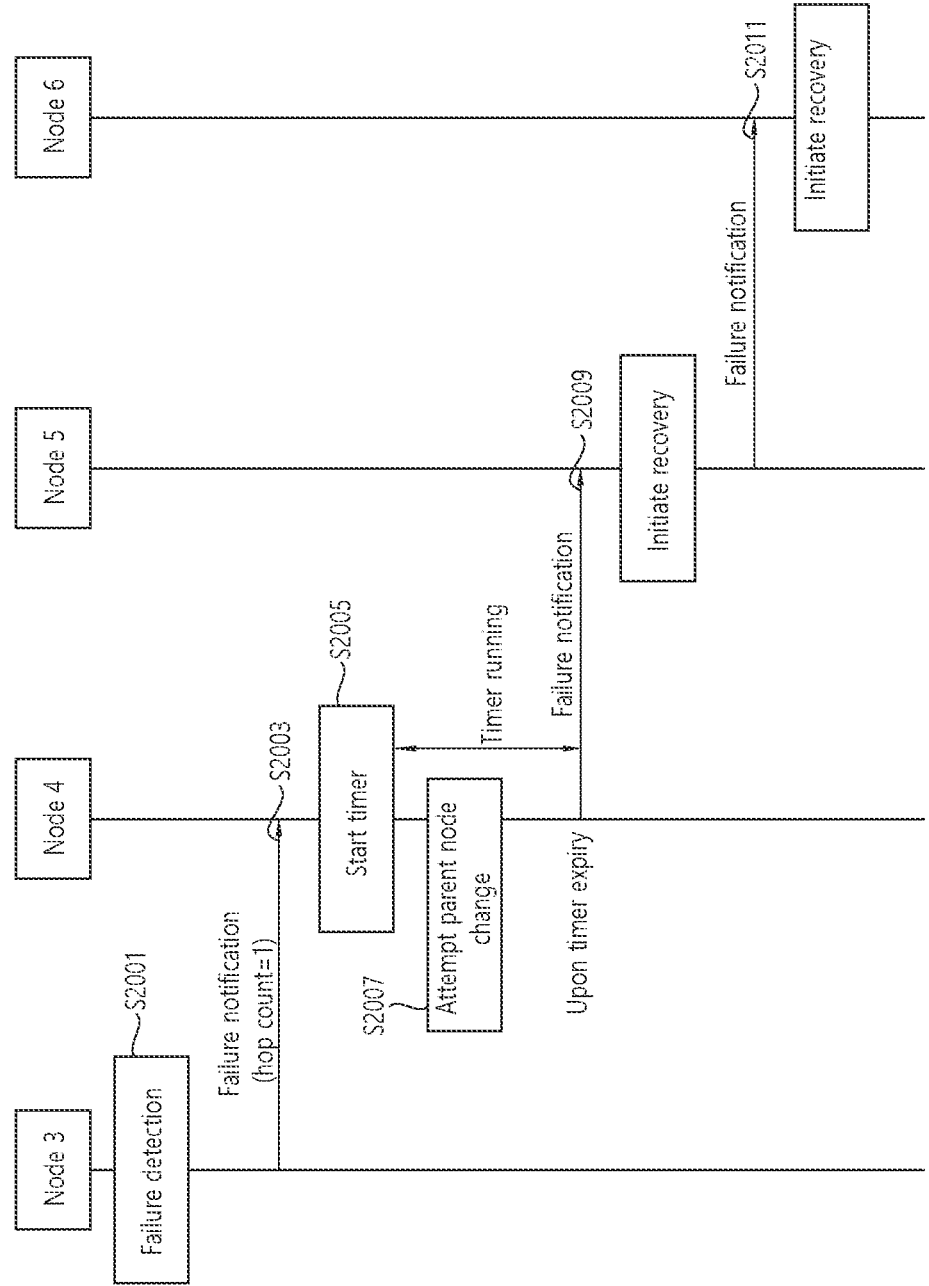
FIG. 20 shows an example of a propagation of a failure notification for a backhaul link when an upper bound of failure-hop distance exists according to an embodiment of the present disclosure.

FIG. 20 shows an example of a propagation of a failure notification for a backhaul link when an upper bound of failure-hop distance exists according to an embodiment of the present disclosure.

Referring to FIG. 20, in step S2001, an IAB node 3 (i.e., zero-hop failure-distance IAB node) may monitor a backhaul link established between the IAB node 3 and its parent IAB node (i.e., IAB node 2) to detect the occurrence of the failure of the backhaul link, and may identify the occurrence of the backhaul link failure.

In step S2003, if the IAB node 3 identifies the occurrence of the backhaul link failure, the IAB node 3 may construct a message that notifies the failure of the backhaul link and deliver a failure notification message (or simply failure notification) for the backhaul link to its 1-hop failure-distance child IAB node(s) (e.g., IAB node 4). The failure notification message may represent one-hop distance backhaul link failure. Therefore, the IAB node 3 may set the hop-count to one in the failure notification message being constructed. Alternatively, the hop-count field can be omitted in the failure notification message for signaling optimization.

In step S2005, upon receiving the failure notification, the IAB node 4, whose failure distance is equal to or less than a delay threshold, may start a timer. If the IAB node 4 (i.e., 1-hop failure-distance node) is not configured with a condition to evaluate the need of an early failure notification propagation (i.e., early propagation condition), or if the IAB node 4 (i.e., 1-hop failure-distance node) is configured with the condition to evaluate the need of an early failure notification propagation and the condition is not satisfied, the IAB node 4 may not immediately propagate/transmit the failure notification to its child node(s) (i.e., IAB node 5).

According to various embodiments, the delay threshold may be configured for the IAB node 4 by a donor node via a higher layer signalling (e.g., RRC signalling or F1AP signalling), or informed by the failure notification received from the parent node (i.e., IAB node 3). In this case, the failure notification may comprise the delay threshold.

In step S2007, the IAB node 4 may perform a recovery attempt to establish a new communication path/link preferably with other IAB node, or to perform a change of its parent node as a recovery process, while the timer is running. For example, the IAB node 4 may perform a connection re-establishment attempt. The IAB node 4 may consider its parent node (i.e., IAB node 3) as access-barred, and search for other candidate nodes to re-connect. If the IAB node 4 is already configured with some UE-autonomous mobility criteria (often called conditional mobility/handover), the IAB node 4 may evaluate the criteria and perform a mobility based on the criteria e.g., by selecting an IAB node satisfying the mobility criterion and attempting to connect to the selected IAB node. The IAB node 4 may reset the timer if the recovery process is successful while the timer is running.

In step S2009, if the timer expires or the recovery attempt does not succeed while the timer is running, the IAB node 4 may immediately send a failure notification to its child node(s) (i.e. two or more hop failure-distance child nodes, for example IAB node 5 and IAB node 6). The IAB node 4 may set/update the hop-count field in the failure notification message to a value that is calculated as received hop-count+1. If the received failure notification does not contain any hop-count field, the IAB node 4 may generate the hop-count filed, and may include and set the hop-count field to value 2.

According to various embodiments, the IAB node 4 may also immediately send a failure notification to its child node(s) (i.e. two or more hop failure-distance child nodes, for example IAB node 5 and IAB node 6) if the condition to trigger the early failure notification propagation (i.e., early propagation condition) is configured for the IAB node 4 and is satisfied. In this case, the IAB node 4 may not start the timer in step S2005.

In step S2011, upon receiving the failure notification comprising the hop-count field set to a value greater than the delay threshold (i.e., a failure-distance of the IAB node 5 receiving the failure notification is greater than the delay threshold), the IAB node 5 receiving the failure notification may immediately send a failure notification message to its child node(s) (e.g., IAB node 6). The IAB node 5 may set/update the hop-count field in the failure notification message to a value that is calculated as received hop-count+1. After the successful delivery of the failure notification message, the IAB node 5 may immediately initiate its own recovery process without further awaiting recovery or mobility command from its parent node(s) including its donor node. The successful delivery of the failure notification message can be identified as RLC ACK reception. The IAB node 6 may also immediately initiate its own recovery process without further awaiting recovery or mobility command from its parent node(s) including its donor node upon receiving the failure notification from the IAB node 5, since the hop-count field in the received failure notification has a value greater than the delay threshold (i.e., a failure distance of the IAB node 6 is greater than the delay threshold).

As the recovery process, the IAB node (i.e., IAB node 5 or IAB node 6) may initiate connection re-establishment or other type of MT-initiated mobility. For the recovery process, the IAB node may consider its parent node as access-barred, and search for other candidate IAB nodes to re-connect. If the IAB node is already configured with some UE-autonomous mobility criteria (often called conditional mobility), the IAB node may evaluate the criteria and perform a mobility based on the criteria e.g, by selecting an IAB node satisfying the mobility criterion and attempting to connect to the selected IAB node.

According to various embodiments, upon reception of the failure notification, an IAB node may suspend an evaluation on the failure of the uplink between the IAB node and its parent node from which the failure notification is received. The suspension may be to prevent a radio link failure declaration/re-establishment triggering due to UL transmission problem (e.g. reaching maximum number of RLC transmissions towards the path experiencing a link failure between intermediate nodes).

Figure 21:
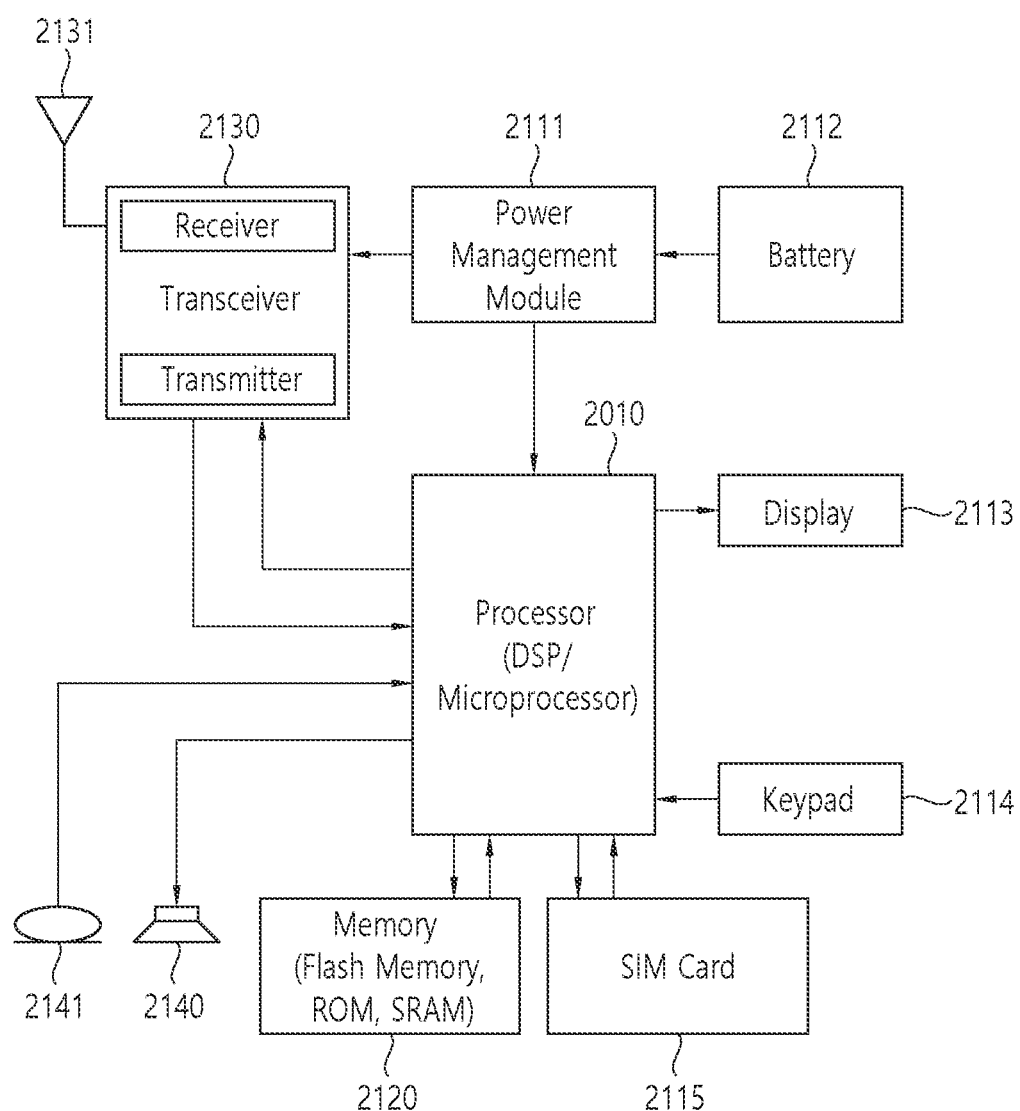
FIG. 21 shows a UE to implement an embodiment of the present disclosure. The present disclosure described above for UE side may be applied to this embodiment.

FIG. 21 shows a UE to implement an embodiment of the present disclosure. The present disclosure described above for UE side may be applied to this embodiment.

A UE includes a processor 2110, a power management module 2111, a battery 2112, a display 2113, a keypad 2114, a subscriber identification module (SIM) card 2115, a memory 2120, a transceiver 2130, one or more antennas 2131, a speaker 2140, and a microphone 2141.

The processor 2110 may be configured to implement proposed functions, procedures and/or methods described in this description. Layers of the radio interface protocol may be implemented in the processor 2110. The processor 2110 may include application-specific integrated circuit (ASIC), other chipset, logic circuit and/or data processing device. The processor 2110 may be an application processor (AP). The processor 2110 may include at least one of a digital signal processor (DSP), a central processing unit (CPU), a graphics processing unit (GPU), a modem (modulator and demodulator). An example of the processor 2110 may be found in SNAPDRAGON™ series of processors made by Qualcomm®, EXYNOS™ series of processors made by Samsung R, A series of processors made by Apple®, HELIO™ series of processors made by MediaTek®, ATOM™ series of processors made by Intel® or a corresponding next generation processor.

The processor 2110 may be configured to, or configured to control the transceiver 2130 to implement steps performed by the UE and/or the wireless device throughout the disclosure.

The power management module 2111 manages power for the processor 2110 and/or the transceiver 2130. The battery 2112 supplies power to the power management module 2111. The display 2113 outputs results processed by the processor 2110. The keypad 2114 receives inputs to be used by the processor 2110. The keypad 2114 may be shown on the display 2113. The SIM card 2115 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 2120 is operatively coupled with the processor 2110 and stores a variety of information to operate the processor 2110. The memory 2120 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 2120 and executed by the processor 2110. The memory 2120 can be implemented within the processor 2110 or external to the processor 2110 in which case those can be communicatively coupled to the processor 2110 via various means as is known in the art.

The transceiver 2130 is operatively coupled with the processor 2110, and transmits and/or receives a radio signal.

The transceiver 2130 includes a transmitter and a receiver. The transceiver 2130 may include baseband circuitry to process radio frequency signals. The transceiver 2130 controls the one or more antennas 2131 to transmit and/or receive a radio signal.

The speaker 2140 outputs sound-related results processed by the processor 2110. The microphone 2141 receives sound-related inputs to be used by the processor 2110.

Figure 22:
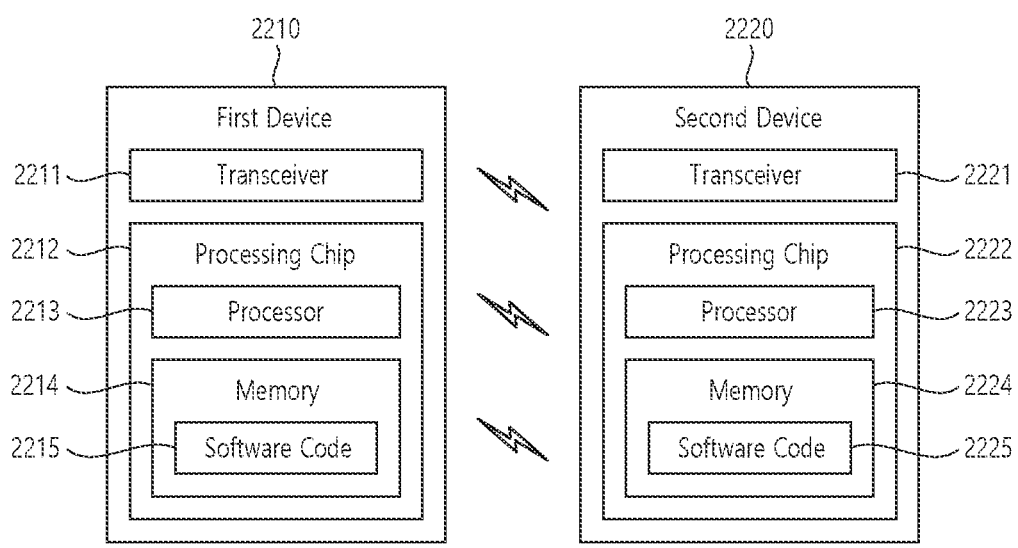
FIG. 22 shows another example of a wireless communication system to which the technical features of the present disclosure can be applied.

FIG. 22 shows another example of a wireless communication system to which the technical features of the present disclosure can be applied.

Referring to FIG. 22, the wireless communication system may include a first device 2210 (i.e., first device 210) and a second device 2220 (i.e., second device 220).

The first device 2210 may include at least one transceiver, such as a transceiver 2211, and at least one processing chip, such as a processing chip 2212. The processing chip 2212 may include at least one processor, such a processor 2213, and at least one memory, such as a memory 2214. The memory may be operably connectable to the processor 2213. The memory 2214 may store various types of information and/or instructions. The memory 2214 may store a software code 2215 which implements instructions that, when executed by the processor 2213, perform operations of the first device 910 described throughout the disclosure. For example, the software code 2215 may implement instructions that, when executed by the processor 2213, perform the functions, procedures, and/or methods of the first device 2210 described throughout the disclosure. For example, the software code 2215 may control the processor 2213 to perform one or more protocols. For example, the software code 2215 may control the processor 2213 to perform one or more layers of the radio interface protocol.

The second device 2220 may include at least one transceiver, such as a transceiver 2221, and at least one processing chip, such as a processing chip 2222. The processing chip 2222 may include at least one processor, such a processor 2223, and at least one memory, such as a memory 2224. The memory may be operably connectable to the processor 2223. The memory 2224 may store various types of information and/or instructions. The memory 2224 may store a software code 2225 which implements instructions that, when executed by the processor 2223, perform operations of the second device 2220 described throughout the disclosure. For example, the software code 2225 may implement instructions that, when executed by the processor 2223, perform the functions, procedures, and/or methods of the second device 2220 described throughout the disclosure. For example, the software code 2225 may control the processor 2223 to perform one or more protocols. For example, the software code 2225 may control the processor 2223 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 23:
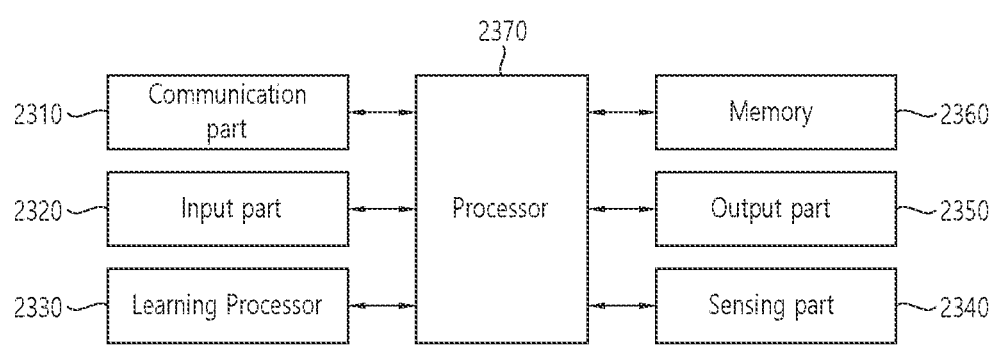
FIG. 23 shows an example of an AI device to which the technical features of the present disclosure can be applied.

FIG. 23 shows an example of an AI device to which the technical features of the present disclosure can be applied.

The AI device 2300 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 23, the AI device 2300 may include a communication part 2310, an input part 2320, a learning processor 2330, a sensing part 2340, an output part 2350), a memory 2360, and a processor 2370).

The communication part 2310 can transmit and/or receive data to and/or from external devices such as the AI devices and the AI server using wire and/or wireless communication technology. For example, the communication part 2310 can transmit and/or receive sensor information, a user input, a learning model, and a control signal with external devices. The communication technology used by the communication part 2310 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 2320 can acquire various kinds of data. The input part 2320 may include a camera for inputting a video signal, a microphone for inputting an audio signal, and a user input part for receiving information from a user. A camera and/or a microphone may be treated as a sensor, and a signal obtained from a camera and/or a microphone may be referred to as sensing data and/or sensor information. The input part 2320 can acquire input data to be used when acquiring an output using learning data and a learning model for model learning. The input part 2320 may obtain raw input data, in which case the processor 2370 or the learning processor 2330 may extract input features by preprocessing the input data.

The learning processor 2330 may learn a model composed of an ANN using learning data. The learned ANN can be referred to as a learning model. The learning model can be used to infer result values for new input data rather than learning data, and the inferred values can be used as a basis for determining which actions to perform. The learning processor 2330 may perform AI processing together with the learning processor of the AI server. The learning processor 2330 may include a memory integrated and/or implemented in the AI device 2300. Alternatively, the learning processor 2330 may be implemented using the memory 2360, an external memory directly coupled to the AI device 2300, and/or a memory maintained in an external device.

The sensing part 2340) may acquire at least one of internal information of the AI device 2300, environment information of the AI device 2300, and/or the user information using various sensors. The sensors included in the sensing part 2340 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 2350 may generate an output related to visual, auditory, tactile, etc. The output part 2350) may include a display unit for outputting visual information, a speaker for outputting auditory information, and/or a haptic module for outputting tactile information.

The memory 2360 may store data that supports various functions of the AI device 2300. For example, the memory 2360 may store input data acquired by the input part 2320, learning data, a learning model, a learning history, etc.

The processor 2370 may determine at least one executable operation of the AI device 2300 based on information determined and/or generated using a data analysis algorithm and/or a machine learning algorithm. The processor 2370 may then control the components of the AI device 2300 to perform the determined operation. The processor 2370 may request, retrieve, receive, and/or utilize data in the learning processor 2330 and/or the memory 2360, and may control the components of the AI device 2300 to execute the predicted operation and/or the operation determined to be desirable among the at least one executable operation. The processor 2370 may generate a control signal for controlling the external device, and may transmit the generated control signal to the external device, when the external device needs to be linked to perform the determined operation. The processor 2370 may obtain the intention information for the user input and determine the user's requirements based on the obtained intention information. The processor 2370 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 2330 and/or learned by the learning processor of the AI server, and/or learned by their distributed processing. The processor 2370) may collect history information including the operation contents of the AI device 2300 and/or the user's feedback on the operation, etc. The processor 2370 may store the collected history information in the memory 2360 and/or the learning processor 2330, and/or transmit to an external device such as the AI server. The collected history information can be used to update the learning model. The processor 2370) may control at least some of the components of AI device 2300 to drive an application program stored in memory 2360. Furthermore, the processor 2370 may operate two or more of the components included in the AI device 2300 in combination with each other for driving the application program.

Figure 24:
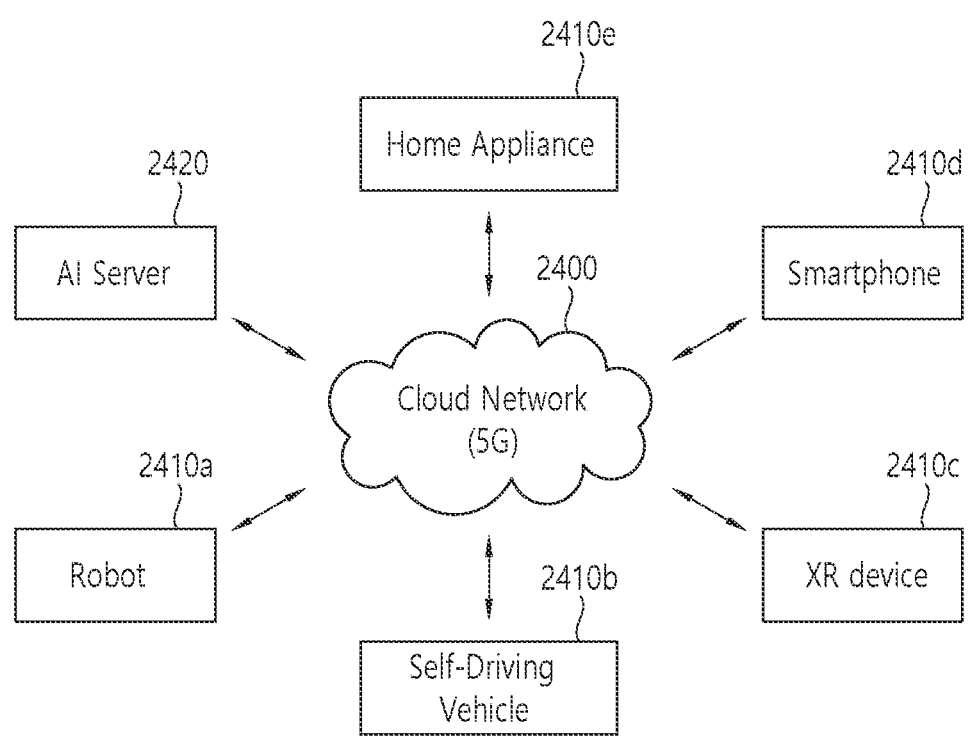
FIG. 24 shows an example of an AI system to which the technical features of the present disclosure can be applied.

FIG. 24 shows an example of an AI system to which the technical features of the present disclosure can be applied.

Referring to FIG. 24, in the AI system, at least one of an AI server 2420, a robot 2410a, an autonomous vehicle 2410b, an XR device 2410c, a smartphone 2410d and/or a home appliance 2410e is connected to a cloud network 2400. The robot 2410a, the autonomous vehicle 2410b, the XR device 2410c, the smartphone 2410d, and/or the home appliance 2410e to which the AI technology is applied may be referred to as AI devices 2410a to 2410e.

The cloud network 2400 may refer to a network that forms part of a cloud computing infrastructure and/or resides in a cloud computing infrastructure. The cloud network 2400 may be configured using a 3G network, a 4G or LTE network, and/or a 5G network. That is, each of the devices 2410a to 2410e and 2420 consisting the AI system may be connected to each other through the cloud network 2400. In particular, each of the devices 2410a to 2410e and 2420 may communicate with each other through a base station, but may directly communicate with each other without using a base station.

The AI server 2420 may include a server for performing AI processing and a server for performing operations on big data. The AI server 2420 is connected to at least one or more of AI devices constituting the AI system, i.e. the robot 2410a, the autonomous vehicle 2410b, the XR device 2410c, the smartphone 2410d and/or the home appliance 2410e through the cloud network 2400, and may assist at least some AI processing of the connected AI devices 2410a to 2410e. The AI server 2420 can learn the ANN according to the machine learning algorithm on behalf of the AI devices 2410a to 2410e, and can directly store the learning models and/or transmit them to the AI devices 2410a to 2410e. The AI server 2420 may receive the input data from the AI devices 2410a to 2410e, infer the result value with respect to the received input data using the learning model, generate a response and/or a control command based on the inferred result value, and transmit the generated data to the AI devices 2410a to 2410e. Alternatively, the AI devices 2410a to 2410e may directly infer a result value for the input data using a learning model, and generate a response and/or a control command based on the inferred result value.

Various embodiments of the AI devices 2410a to 2410e to which the technical features of the present disclosure can be applied will be described. The AI devices 2410a to 2410e shown in FIG. 24 can be seen as specific embodiments of the AI device 2300 shown in FIG. 23.

The present disclosure can have various advantageous effects.

For example, an IAB node in IAB network may determine whether to immediately propagate a failure notification for a backhaul link based on an early propagation condition and/or a failure-distance of the IAB node so that the network can achieve localization/minimization of a topological change via systematic and sequential recovery whenever possible, and can achieve a fostering of timely recovery when the localization/minimization of the topological change is hard to be achieved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by an integrated access and backhaul (IAB) node in a wireless communication system, the method comprising:
   receiving, from a parent node for the IAB node over a backhaul (BH) radio link control (RLC) channel, a protocol data unit (PDU) comprising a first BH link failure notification notifying a failure of a backhaul link between IAB nodes;
   performing a connection re-establishment attempt based on a reception of the PDU comprising the first BH link failure notification;
   detecting a failure of the connection re-establishment attempt; and
   based on the failure of the connection re-establishment attempt being detected, transmitting, to a child node for the IAB node over a BH RLC channel, a PDU comprising a second BH link failure notification notifying the failure of the backhaul link,
   wherein the first BH link failure notification and the second BH link failure notification are transferred in a downstream direction.

2. The method of claim 1, further comprising:
   identifying a hop-count value in the first BH link failure notification; and
   determining whether the hop-count value is greater than a delay threshold,
   wherein the hop-count value represents a failure distance of the IAB node, and
   wherein the performing of the connection re-establishment attempt comprises performing the connection re-establishment attempt based on the hop-count value being less than or equal to the delay threshold.

3. The method of claim 2, wherein the delay threshold is configured for the IAB node by a donor node via a higher layer signaling, or informed by the first BH link failure notification.

4. The method of claim 2, further comprising:
   incrementing the hop-count value by 1,
   wherein the second BH link failure notification comprises the incremented hop-count value to the child node.

5. The method of claim 1, further comprising:
   after receiving the PDU comprising the first BH link failure notification, starting a timer,
   wherein the performing of the connection re-establishment attempt comprises performing the connection re-establishment attempt while the timer is running, and
   wherein transmitting of the PDU comprising the second BH link failure notification comprises transmitting the PDU comprising second BH link failure notification to the child node based on at least one of i) an expiry of the timer or ii) the failure of the connection re-establishment attempt while the timer is running.

6. The method of claim 5, wherein a value of the timer is configured for the IAB node by a donor node via a higher layer signaling, or informed by the first BH link failure notification.

7. The method of claim 1, wherein the performing of the connection re-establishment attempt comprises performing the connection re-establishment attempt based on a determination that:
   an early propagation condition is not configured for the IAB node; or
   the early propagation condition is configured for the IAB node and is not satisfied,
   wherein the early propagation condition is a condition for transmitting the second BH link failure notification to the child node upon determining that the early propagation condition is satisfied.

8. The method of claim 7, wherein the early propagation condition comprises at least one of:
   a first condition that a list of candidate nodes for the connection re-establishment attempt is not configured for the IAB node; or
   a second condition that mobility commands of the candidate nodes are not configured for the IAB node.

9. The method of claim 7, wherein the early propagation condition is provided by a donor node to the IAB node, or informed by the first BH link failure notification.

10. The method of claim 1, wherein the performing of the connection re-establishment attempt comprises:
    selecting another parent node for the IAB node that is different from the parent node for the IAB node; and
    performing an attempt to establish a connection between the IAB node and the selected parent node.

11. The method of claim 1, wherein the performing of the connection re-establishment attempt comprises:
    performing a conditional handover from the parent node for the IAB node to another parent node.

12. The method of claim 11, wherein the performing of the conditional handover comprises:

receiving, from the parent node for the IAB node, handover conditions of candidate parent nodes;

identifying a parent node among the candidate parent nodes which satisfies a handover condition based on a result of a measurement; and applying a handover command of the identified parent node to perform the conditional handover from a current parent node to the identified parent node.

13. An integrated access and backhaul (IAB) node in a wireless communication system comprising:

a transceiver;

a memory; and at least one processor operatively coupled to the transceiver and the memory, wherein the memory stores instructions that, based on being executed by the at least one processor, perform operations comprising:

receiving, from a parent node for the IAB node over a backhaul (BH) radio link control (RLC) channel, a protocol data unit (PDU) comprising a first BH link failure notification notifying a failure of a backhaul link between IAB nodes;

performing a connection re-establishment attempt based on a reception of the PDU comprising the first BH link failure notification;

detecting a failure of the connection re-establishment attempt; and based on the failure of the connection re-establishment attempt being detected, transmitting, to a child node for the IAB node over a BH RLC channel, a PDU comprising a second BH link failure notification notifying the failure of the backhaul link, wherein the first BH link failure notification and the second BH link failure notification are transferred in a downstream direction.

14. A user equipment (UE) configured to operate in a wireless communication system, the UE comprising:

a transceiver;

a memory; and at least one processor operatively coupled to the transceiver and the memory, wherein the memory stores instructions that, based on being executed by the at least one processor, perform operations comprising:

communicating with an integrated access and backhaul (IAB) node, wherein the IAB node performs a connection re-establishment attempt based on receiving, from a parent node for the IAB node over a backhaul (BH) radio link control (RLC) channel, a protocol data unit (PDU) comprising a first BH link failure notification notifying a failure of a backhaul link between IAB nodes, wherein, based on a failure of the connection re-establishment attempt being detected, the IAB node transmits, to a child node for the IAB node over a BH RLC channel, a PDU comprising a second BH link failure notification notifying the failure of the backhaul link, and wherein the first BH link failure notification and the second BH link failure notification are transferred in a downstream direction.

\* \* \* \* \*